United States Patent
Hirao

(10) Patent No.: US 10,346,513 B2
(45) Date of Patent: Jul. 9, 2019

(54) IMAGE PROCESSING APPARATUS CAPABLE OF MERGING CHARACTER STRINGS WITH ORIGINAL IMAGE, CONTROL METHOD THEREFOR, AND STORAGE MEDIUM

(71) Applicant: CANON KABUSHIKI KAISHA, Tokyo (JP)

(72) Inventor: Toyomi Hirao, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/103,278

(22) Filed: Aug. 14, 2018

(65) Prior Publication Data

US 2018/0357208 A1 Dec. 13, 2018

Related U.S. Application Data

(63) Continuation of application No. 14/488,745, filed on Sep. 17, 2014, now Pat. No. 10,078,622.

(30) Foreign Application Priority Data

Sep. 18, 2013 (JP) .................................. 2013-193187

(51) Int. Cl.
  *H04N 1/32* (2006.01)
  *G06F 17/22* (2006.01)
  (Continued)

(52) U.S. Cl.
  CPC ........ *G06F 17/2223* (2013.01); *G06F 17/289* (2013.01); *G06K 15/1827* (2013.01);
  (Continued)

(58) Field of Classification Search
  USPC ....................................................... 358/1.14
  See application file for complete search history.

(56) References Cited

U.S. PATENT DOCUMENTS

| 5,715,069 A | 2/1998 | Hersee et al. |
| 7,052,196 B2 | 5/2006 | Ueno et al. |

(Continued)

FOREIGN PATENT DOCUMENTS

| CN | 1708406 A | 12/2005 |
| CN | 103019632 A | 4/2013 |

(Continued)

OTHER PUBLICATIONS

Extended European Search Report issued in European Appln. No. 14003180.8 dated Jan. 19, 2015.

(Continued)

*Primary Examiner* — Neil R McLean
*Assistant Examiner* — Darryl V Dottin
(74) *Attorney, Agent, or Firm* — Rossi, Kimms & McDowell LLP

(57) ABSTRACT

An image processing apparatus which is capable of merging character strings with an original image without causing garbling. A first storage unit stores first character codes corresponding to a first language in accordance with administrator's input. A second storage unit stores a second character codes corresponding to a second character in accordance with login user's input. A reading unit reads an original image in accordance with login user's input. A generation unit generates a first character image corresponding to the first language on the basis of the first character codes and generates a second character image corresponding to the second language on the basis of the second character codes. A printing unit carries out a printing process based on the first character image, the second character image and the original image.

12 Claims, 20 Drawing Sheets

(51) Int. Cl.
*G06F 17/28* (2006.01)
*G06K 15/02* (2006.01)

(52) U.S. Cl.
CPC ..... *G06K 15/1885* (2013.01); *G06K 15/1889* (2013.01); *H04N 1/32128* (2013.01); *H04N 1/32133* (2013.01)

(56) References Cited

U.S. PATENT DOCUMENTS

| | | |
|---|---|---|
| 7,353,283 B2 | 4/2008 | Henaff et al. |
| 8,749,844 B2 | 6/2014 | Shibano |
| 9,552,086 B2 | 1/2017 | Tomono |
| 2005/0271444 A1* | 12/2005 | Ueno .................. B41J 3/4075 400/613.1 |
| 2011/0007351 A1 | 1/2011 | Kurumasa et al. |
| 2011/0157634 A1 | 6/2011 | Shibata |
| 2013/0016372 A1 | 1/2013 | Shibano |
| 2013/0169985 A1 | 7/2013 | Inomata et al. |
| 2015/0220494 A1 | 8/2015 | Qin et al. |

FOREIGN PATENT DOCUMENTS

| | | |
|---|---|---|
| JP | 2859208 B2 | 2/1999 |
| JP | 2000118057 A | 4/2000 |
| JP | 2005038371 A | 2/2005 |
| JP | 2005196397 A | 7/2005 |
| JP | 2007317225 A | 12/2007 |
| JP | 2011134285 A | 7/2011 |
| JP | 2011168007 A | 9/2011 |
| JP | 2013020585 A | 1/2013 |
| WO | 2004039596 A1 | 5/2004 |

OTHER PUBLICATIONS

Office Action issued in Japanese Appln. No. 2013-193187 dated Aug. 18, 2015.
Office Action issued in Korean Appln. No. 10-2014-0123416 dated Nov. 30, 2016.
Office Action issued in Chinese Appln. No. 201410475187.0 dated Mar. 9, 2017. English translation provided.
Office Action issued in U.S. Appl. No. 14/488,745 dated Sep. 23, 2015.
Office Action issued in U.S. Appl. No. 14/488,745 dated Mar. 3, 2016.
Office Action issued in U.S. Appl. No. 14/488,745 dated Aug. 12, 2016.
Office Action issued in U.S. Appl. No. 14/488,745 dated Apr. 4, 2017.
Office Action issued in U.S. Appl. No. 14/488,745 dated Nov. 24, 2017.
Notice of Allowance issued in U.S. Appl. No. 14/488,745 dated May 17, 2018.
Office Action issued in European Appln. No. 14003180.8 dated Feb. 1, 2019.
Office Action issued in Chinese Appln. No. 201810319522.6 dated Apr. 1, 2019. English translation provided.

* cited by examiner

IMAGE PROCESSING APPARATUS CAPABLE OF MERGING CHARACTER STRINGS WITH ORIGINAL IMAGE, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

Image processing apparatuses have a function of merging an image such as a page number or a stamp which is not present in an original image and printing a resulting composite image (see, for example, Japanese Patent No. 2859208). Image processing apparatuses also have a function of authenticating users at the start of use and performing customization and switching display languages according to users.

There are cases where images to be merged with an original image represent an arbitrary character string as well as the number of pages, the number of copies, and so on. Such images are merged with an original image based on arbitrary settings configured by a user at the time of copying or executing a print job.

Moreover, there may be cases where in order to make a source of printed matter clear, an administrator of an image processing apparatus forcefully merges an arbitrary character string with an original image. The character string to be forcefully merged with the original image is set in the image processing apparatus by the administrator and merged as an image with all printed matter.

To convert a character string into an image, font expansion is performed to generate the image from the character string. On this occasion, a font to be used is determined based on a display language for a user who has executed a job. For example, in a case where a display language for an administrator is Japanese, and a display language for a user who executes a job is English, font expansion of a character string set by the administrator is performed using a font that supports English, which is the display language for the user who executes the job, even when the character string set by the administrator and forcefully merged with an original image is a Japanese character string.

Some English fonts, however, cannot express Japanese, and when a character string set by an administrator does not support a font which is used for a display language for a user, images cannot be normally generated.

Moreover, even in a case where a font which is used for a display language for a user is a font capable of expanding images of character strings set by an administrator, when different fonts are used for a character string set by the administrator and a character string designated for merging with an original image by a user, the character string set by the administrator and the character string designated by the user will be different images sometimes even if the same character strings are printed.

SUMMARY OF THE INVENTION

The present invention provides an image processing apparatus and a control method therefor, which are capable of merging character strings with an original image without causing garbling, as well as a computer-readable storage medium storing a program for implementing the control method.

Accordingly, a first aspect of the present invention provides an image processing apparatus comprising a first storage unit configured to store first character codes corresponding to a first language in accordance with administrator's input, a second storage unit configured to store second character codes corresponding to a second language in accordance with login user's input, a reading unit configured to read an original image in accordance with login user's input, a generation unit configured to generate a first character image corresponding to the first language on the basis of the first character codes and generate a second character image corresponding to the second language on the basis of the second character codes, and a printing unit configured to carry out a printing process based on the first character image, the second character image and the original image.

Accordingly, a second aspect of the present invention provides a control method for an image processing apparatus, comprising a first storage step of storing first character codes corresponding to a first language in accordance with administrator's input, a second storage step of storing second character codes corresponding to a second language in accordance with login user's input, a reading step of reading an original image in accordance with login user's input, a generation step of generating a first character image corresponding to the first language on the basis of the first character codes and generating a second character image corresponding to the second language on the basis of the second character codes, and a printing step of carrying out a printing process based on the first character image, the second character image and the original image.

Accordingly, a third aspect of the present invention provides a non-transitory computer-readable storage medium storing a program for causing a computer to execute a control method for an image processing apparatus, the control method comprising a first storage step of storing first character codes corresponding to a first language in accordance with administrator's input, a second storage step of storing second character codes corresponding to a second language in accordance with login user's input, a reading step of reading an original image in accordance with login user's input, a generation step of generating a first character image corresponding to the first language on the basis of the first character codes and generating a second character image corresponding to the second language on the basis of the second character codes, and a printing step of carrying out a printing process based on the first character image, the second character image and the original image.

According to the present invention, information indicative of the first character codes corresponding to the first language are stored in the first storage unit in accordance with administrator's input, and the second character codes corresponding to the second language are stored in a second storage unit in accordance with login user's input. Moreover, the first character image corresponding to the first language is generated on the basis of the first character codes, and the second character image corresponding to the second language is generated on the basis of the second character codes. A printing process is carried out based on the first character image, the second character image and read original image. As a result, the character strings can be merged with the original image without causing garbling.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
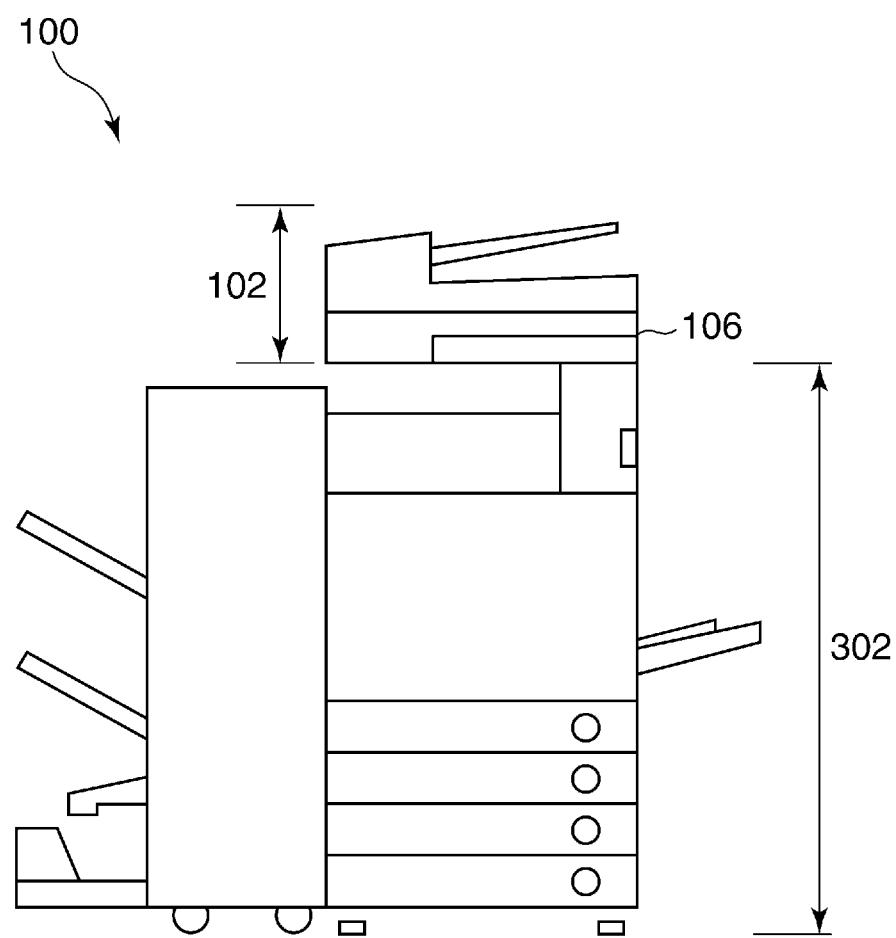
FIG. 1 is a view showing an outer appearance of an image processing apparatus according to an embodiment of the present invention.

FIG. 1 is a view showing an outer appearance of an image processing apparatus 100 according to an embodiment of the present invention.

Referring to FIG. 1, the image processing apparatus 100 includes a scanner unit 102, a printer unit 302, and an operation unit 106. The scanner unit 102 illuminates an original image and scans it with a CCD line sensor to convert the original image into electric image data. Based on the image data obtained by electric conversion, a color judgment, a size judgment, and so on for the original are made. The printer unit 302 prints images, which are represented by image data, on recording media such as sheets, and produced printed matter is subjected to a stapling process and a folding process such as bookbinding.

Figure 2:
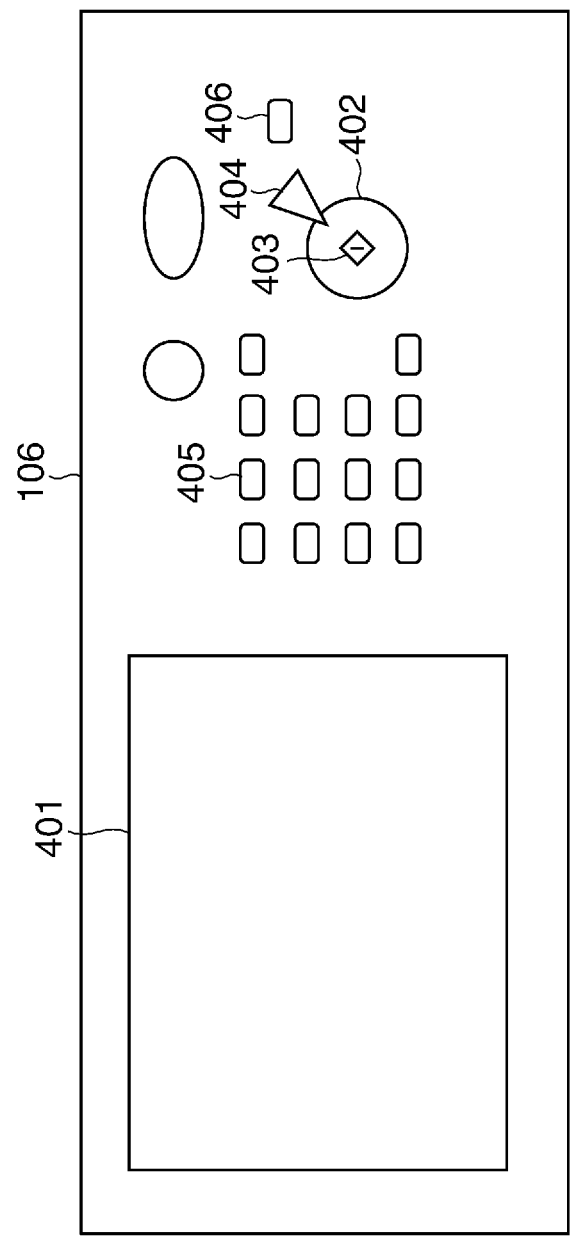
FIG. 2 is a view showing an outer appearance of an operation unit in FIG. 1.

FIG. 2 is a view showing an outer appearance of the operation unit 106 in FIG. 1.

Referring to FIG. 2, the operation unit 106 is comprised of a liquid crystal display unit 401, a start key 402, an LED 403, a stop key 404, a ten-digit keypad 405, and a user mode key 406.

On the liquid crystal display unit 401 to which a touch panel sheet is attached, various operation screens and software keys are displayed. The start key 402 is used in, for example, starting an original reading operation. The LED 403, which is provided in the center of the start key 402, is displayed in two colors, i.e. green and red to indicate whether or not the start key 402 is ready for use. The stop key 404 stops an operation underway.

The ten-digit keypad 405, which is comprised of numerals and character buttons, is used to set the number of copies and switch screens on the liquid crystal display unit 401. The user mode key 406 is for configuring device settings.

Figure 3:
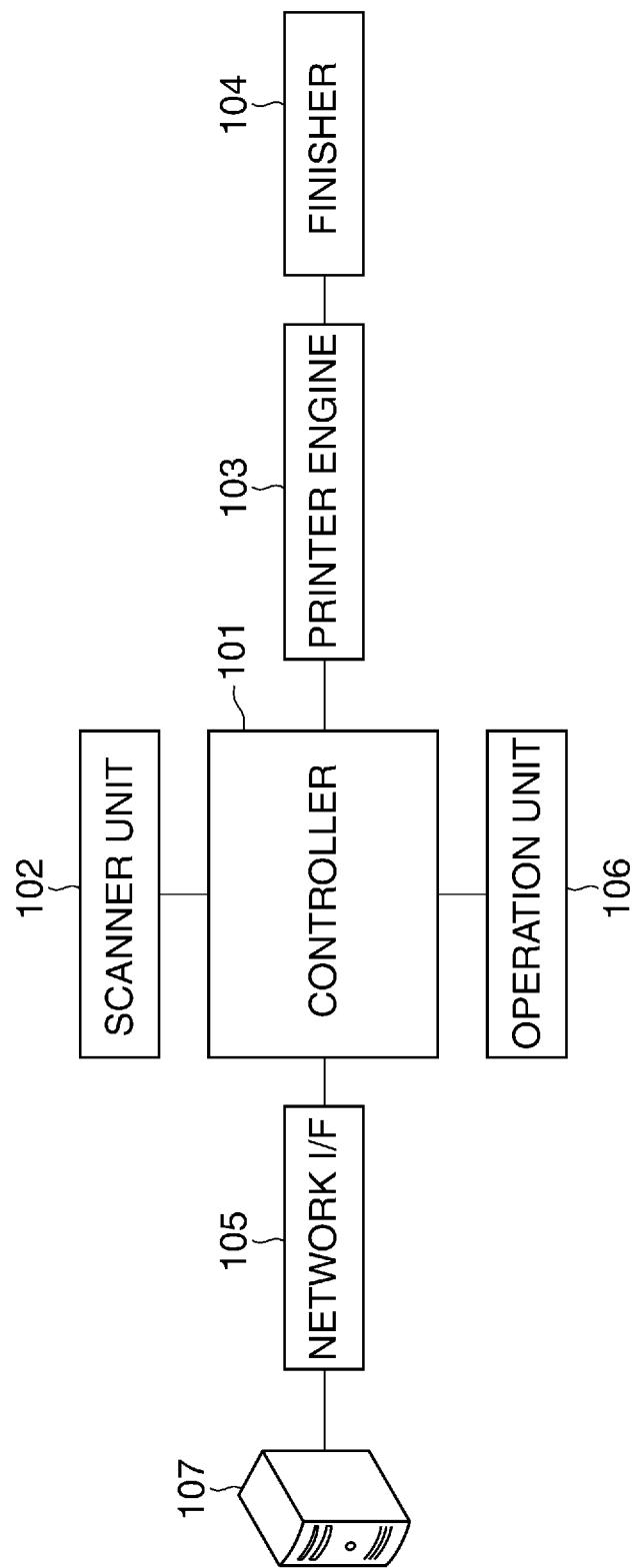
FIG. 3 is a diagram schematically showing an arrangement of the image processing apparatus in FIG. 1.

FIG. 3 is a diagram schematically showing an arrangement of the image processing apparatus 100 in FIG. 1.

Referring to FIG. 3, the image processing apparatus 100 is comprised of a controller 101, the scanner unit 102, a printer engine 103, a finisher 104, a network interface 105, and the operation unit 106.

The controller 101 is connected to the scanner unit 102, the printer engine 103, the operation unit 106, and the network interface 105 and controls the overall operation of the image processing apparatus 100. The printer engine 103 and the finisher 104 constitute the printer unit 302 in FIG. 1, and the finisher 104 carries out the stapling process and the folding process described above on printed matter produced by the printer engine 103 corresponding to a printing unit.

The operation unit 106 displays images on the liquid crystal display unit 401 in accordance with instructions from the controller 101 and also outputs what is input by a user with various keys to the controller 101. The network interface 105 is an interface to a network such as NIC, and in the present embodiment, connected to a user authentication apparatus 107 via a network.

The user authentication apparatus 107 has a user authentication function of authenticating a user based on a user authentication protocol such as the LDAP (Lightweight Directory Access Protocol). Specifically, when a user performs a login operation by inputting authentication information such as a login name and a password, the input authentication information is transmitted to the user authentication apparatus 107 by the controller 101.

The user authentication apparatus 107 searches for user information, which is stored in an internal database, not shown, using the received authentication information. When a user that matches the authentication information is stored (authentication is successful), the user authentication apparatus 107 sends user information including, for example, display language information, which is to be displayed on the display unit 106, to the controller 101. Based on the received user information, the controller 101 switches display languages and displays a control screen for execution of jobs such as copying on the liquid crystal display unit 401. It should be noted that the image processing apparatus 100 may be equipped with the user authentication function of the user authentication apparatus 107.

Figure 4:
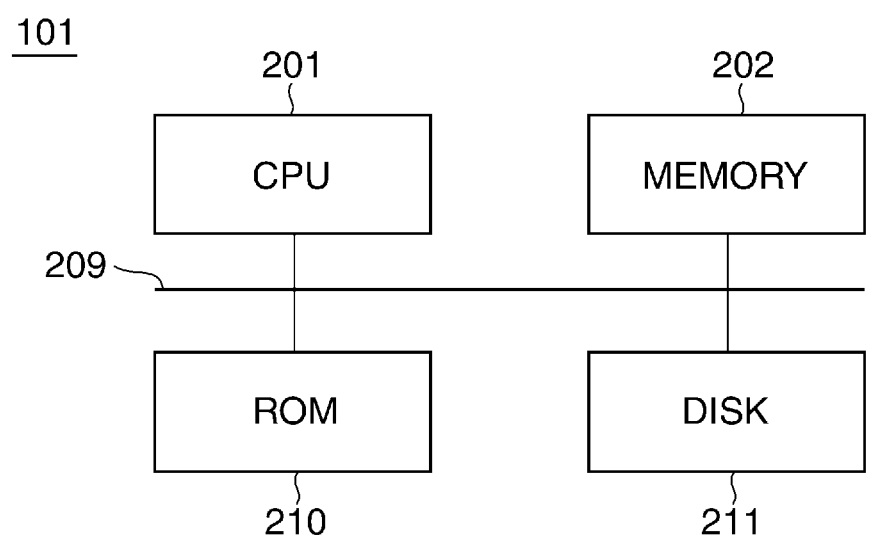
FIG. 4 is a diagram schematically showing an arrangement of a controller in FIG. 3.

FIG. 4 is a diagram schematically showing an arrangement of the controller 101 in FIG. 3.

Referring to FIG. 4, the controller 101 is comprised of a CPU 201, a memory 202, a ROM 210, and a DISK 211, which are connected to one another via a bus 209.

The CPU 201 controls the controller 101. The memory 202, which is a volatile storage device, stores various data such as programs, which are to be executed by the CPU 201, and image data, and is also used as a work area for the CPU 201.

The ROM 210, which is a nonvolatile storage device, stores various data such as a boot program and programs which are to be expanded on the memory 202. The DISK 211, which is a nonvolatile storage device such as a hard disk, stores various data such as programs and image data.

Figure 5A:
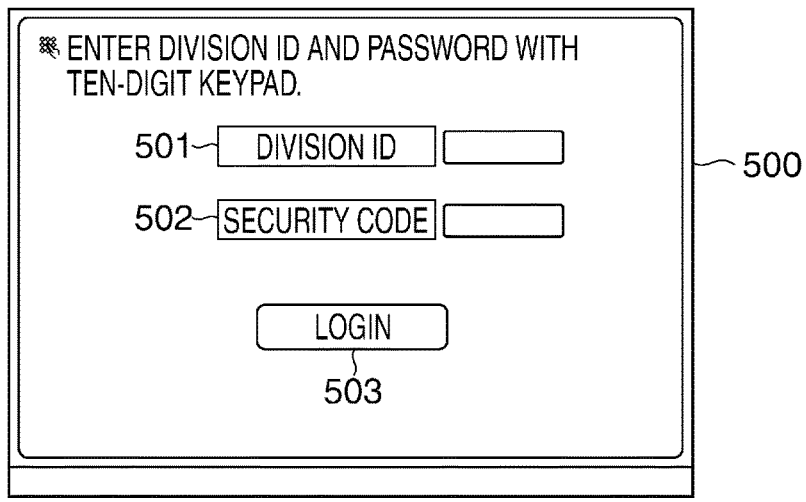
FIGS. 5A to 5C are views showing exemplary screens displayed on a liquid crystal display unit in FIG. 2.
Figure 5B:
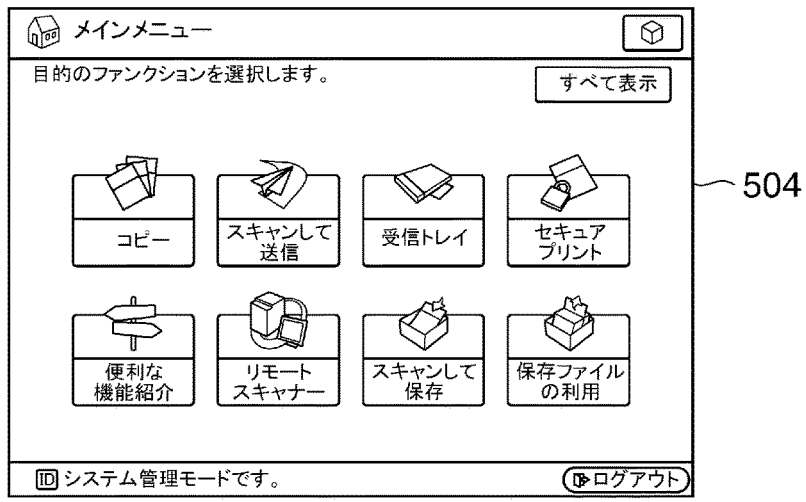
Figure 5C:
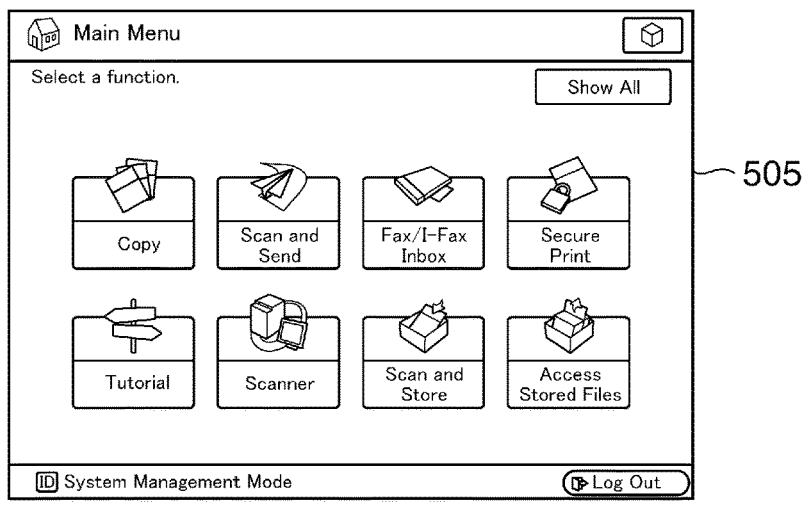

FIGS. 5A to 5C are views showing exemplary screens displayed on the liquid crystal display unit 401 in FIG. 2.

In the following description, a screen that is displayed in the image processing apparatus 100, which displays screens in Japanese under normal conditions, when a language appropriate to a user is English is taken as an example. It should be noted that languages used in the image processing apparatus 100 should not be limited to Japanese and English.

FIG. 5A is a view showing an authentication screen 500. Referring to FIG. 5A, a user depresses a division ID button 501 and then enters a division ID into an input field next to the division ID button 501 using the ten-digit keypad 405 of the operation unit 106. Further, the user depresses a password button 502 and enters a password into an input field next to the password button 502 using the ten-digit keypad 405.

The input division ID and password are stored in the memory 202. After entering the ID and password information, the user depresses a login button 503. When the login button 503 is depressed, the division ID and password stored in the memory 202 are transmitted to the user authentication apparatus 107 by way of a network interface 205.

The user authentication apparatus 107 performs user authentication based on the received authentication information, and when the user authentication is successful, the user authentication apparatus 107 transmits user information stored in advance in an internal database to the image processing apparatus 100.

The controller 101 receives the user information transmitted from the user authentication apparatus 107 and stores the received user information in the memory 202. As a result, the image processing apparatus 100 can identify the user who has logged in to the image processing apparatus 100. It should be noted that the user information also includes information about whether or not the user has an administrator right. In the following description, a user who has an administrator right will be referred to as an administrator, and a user who has no administrative right will be referred to merely as a user. Further, in accordance with display language information for the user included in the user information, the controller 101 displays a main menu screen 504 shown in FIG. 5B or a main menu screen 505 shown in FIG. 5C.

FIG. 5B is a view showing the main menu screen 504 displayed in a case where a display language is Japanese. As shown in this figure, a Japanese screen is displayed when a language corresponding to display language information on the user who has logged in is Japanese.

FIG. 5C is a view showing the main menu screen 505 displayed in a case where a display language is English. As shown in this figure, an English screen is displayed when a language corresponding to display language information on the user who has logged in is English.

Figure 6:
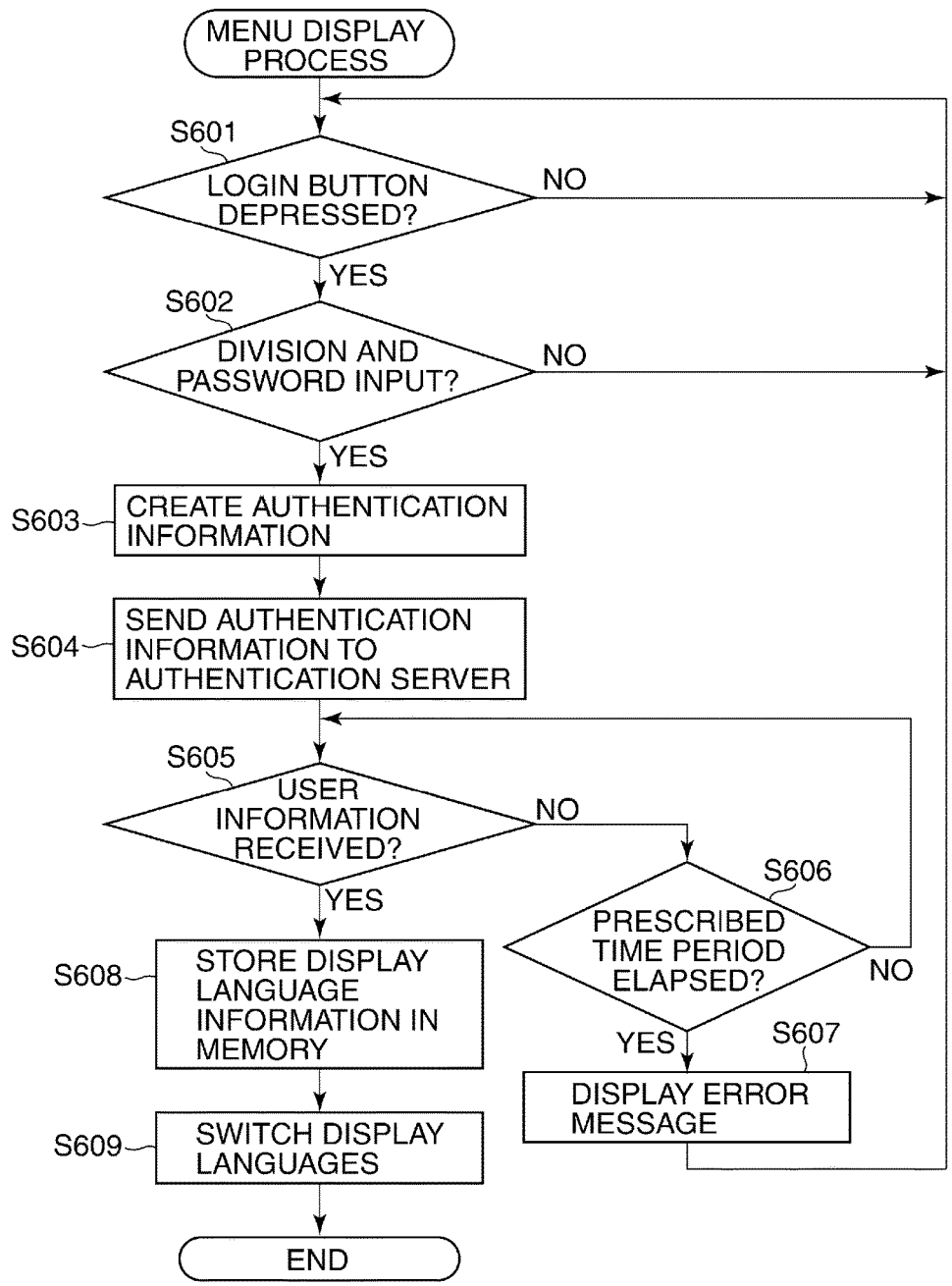
FIG. 6 is a flowchart showing the procedure of a display language switching process which is carried out by a CPU in FIG. 4.

FIG. 6 is a flowchart showing the procedure of a display language switching process which is carried out by the CPU 201 in FIG. 4.

When the CPU 201 determines that a user has depressed the login button 503 on the authentication screen 500 described with reference to FIG. 5 (YES in step S601), it determines whether or not a division ID and a password have been input (step S602).

As a result of the determination in the step S602, when a division ID and a password have not been input (NO in the step S602), the process returns to the step S601. On the other hand, when the CPU 201 determines that a division ID and a password have been input (YES in the step S602), it creates authentication information on the user who has logged in based on the LDAP (step S603) and transmits the created authentication information to the user authentication apparatus 107 (step S604).

The CPU 201 then determines whether or not it has received user information corresponding to the transmitted authentication information from the user authentication apparatus 107 (step S605). As a result of the determination in the step S605, when the CPU 201 has not received the user information (NO in the step S605), it determines whether or not a prescribed time period has elapsed since the login button 503 was depressed (step S606). This prescribed time period is determined in advance so as to determine whether or not a user authentication time-out period has elapsed.

As a result of the determination in the step S606, when the prescribed time period has not elapsed (NO in the step S606), the process returns to the step S605. On the other hand, as a result of the determination in the step S606, when the prescribed time period has elapsed (YES in the step S606), the CPU 201 displays, on the liquid crystal display unit 401, an error message saying that the user authentication is not successful (step S607), followed by the process returning to the step S601.

The process returns to the step S605, and as a result of the determination in the step S605, when the CPU 201 has received the user information (YES in the step S605), it stores display language information included in the user information in the memory 202 (step S608). The CPU 201 then displays a main menu screen in a language specified in the display language information on the liquid crystal display unit 401 (step S609) and terminates the process.

Referring next to FIGS. 7A to 8B, a description will be given of a setting method in a case where an administrator forcefully merges an image of a character string with an original image.

Figure 7A:
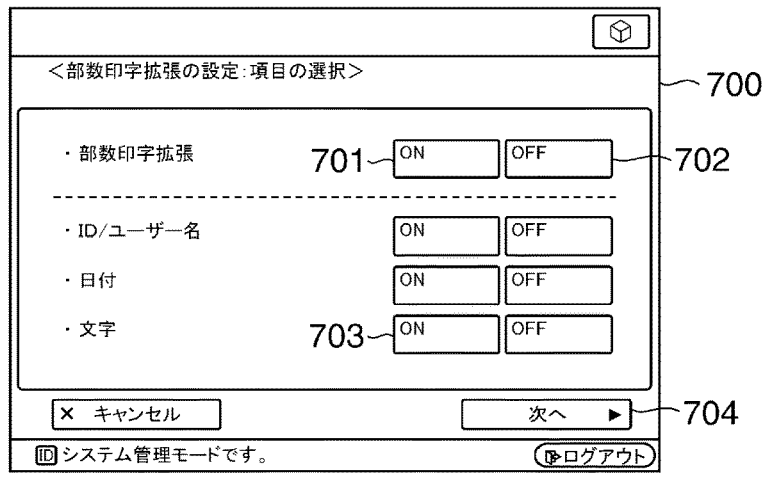
FIGS. 7A to 7C are views which are useful in explaining a setting method in a case where an administrator forcefully merges an image of a character string with an original image.

FIG. 7A shows an administrator setting screen 700 displayed on the liquid crystal display unit 401. The administrator setting screen 700 is displayed by a user who has an administrator right depressing the user mode key 406 of the operation unit 106 and executing a specific operation flow.

To forcefully merge an image with an original image, the administrator depresses a number-of-copies print extended function ON button 701 on the administrator setting screen 700. On the other hand, when no image is to be forcefully merged with an original image, the administrator depresses a number-of-copies print expended function OFF button 702.

After depressing the number-of-copies print extended function ON button 701, the administrator is allowed to select a type of an image to be forcefully merged with an original image such as "ID/user name", "Date", and "Character" displayed below the number-of-copies print extended function ON button 701.

Figure 7B:
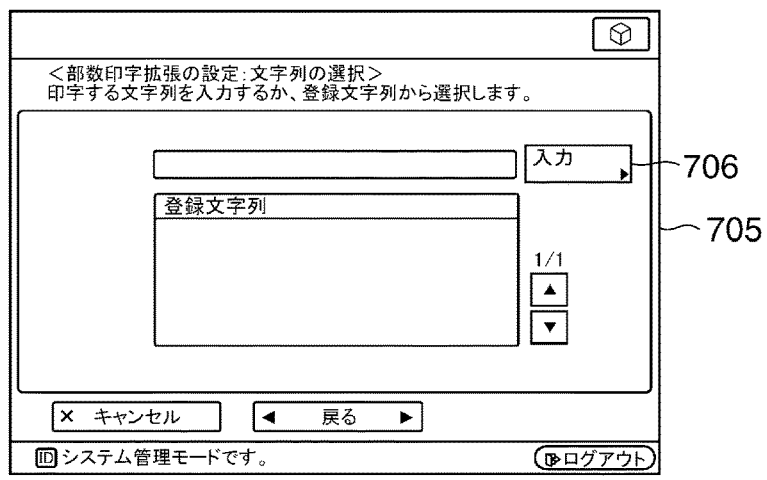

For example, to merge an image of an arbitrary character string with an original image, the administrator depresses a character string adding function button 703 and then depresses a Next button 704. As a result, a character string input screen 705 shown in FIG. 7B is displayed.

Figure 7C:
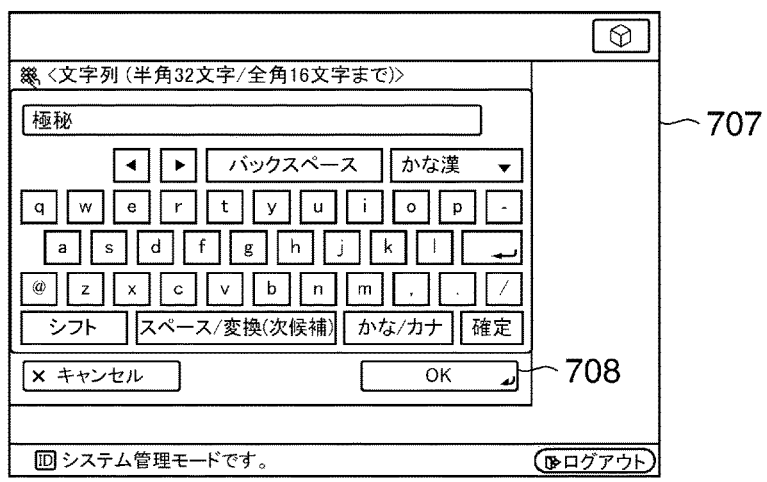

Then, when the administrator depresses an input button 706 on the character string input screen 705, a keyboard screen 707 shown in FIG. 7C is displayed. The administrator inputs a character string using a software keyboard of the keyboard screen 707 and depresses an OK button 708. As a result, the input character string is registered and stored with display language information of the administrator as composite character string information in the DISK 211. As will be described later, a user who has no administrator right is also allowed to register a character string. Thus, the image processing apparatus 100 according to the present embodiment is able to register a character string of an image to be merged with an original image which is an object to be printed.

It should be noted that a character string is stored in a language-independent character code such as UTF-8, not a language-dependent character code such as SHIFT-JIS or EUC. Moreover, a character string input by the administrator and display language information on the administrator are never rewritten by any user who has no administrator right, but they are rewritten only when the administrator himself/herself switches display languages or registers a character string again.

Figure 8A:
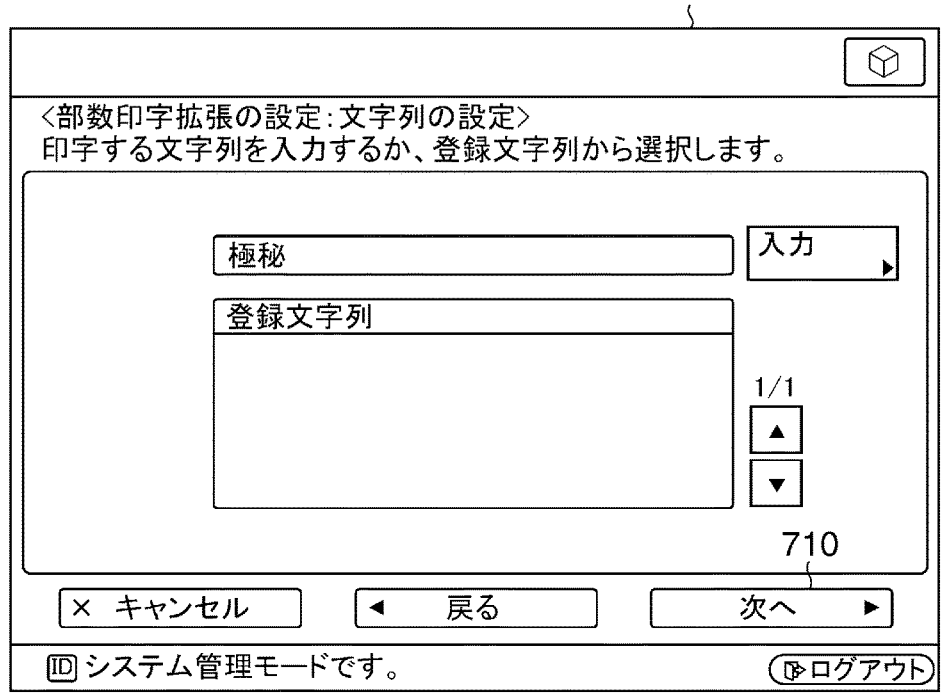
FIGS. 8A and 8B are views which are useful in explaining a setting method in a case where an administrator forcefully merges an image of a character string with an original image.

When the administrator depresses the OK button 708 in FIG. 7C, a character string deciding screen 709 shown in FIG. 8A is displayed. On the character string deciding screen 709, the administrator selects the character string input on the keyboard screen 707 or a character string registered in advance and depresses a Next button 710. As a result, a character string adjustment screen 711 shown in FIG. 8B is displayed.

The character string adjustment screen 711 is for adjusting the character string selected on the character string deciding screen 709 to left-aligned, centered, or right-aligned one. On this screen, when a plurality of character strings is selected, a layout of the character strings with different lengths is set.

Figure 8B:
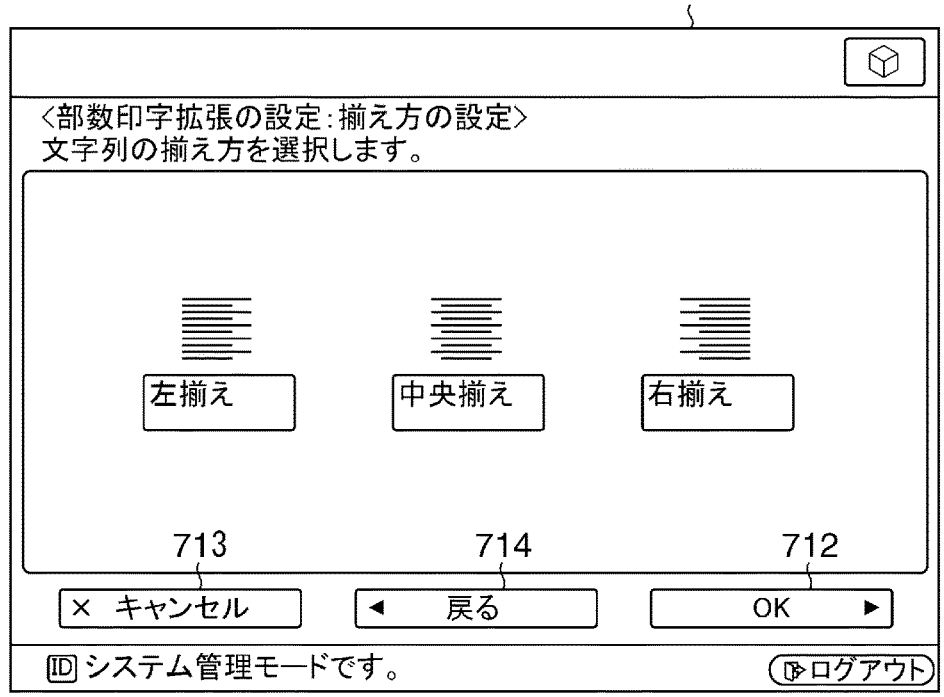

Referring to FIG. 8B, a Back button 714 is for going back to the character string deciding screen 709, and a cancel button 713 is for cancelling information input via the keyboard screen 707, and an OK button 712 is for enabling character string adjustment on the character string adjustment screen 711. When the OK button 712 is depressed in the state shown in FIG. 8B, a character string "Confidential" and a display language "Japanese" are registered.

Referring next to FIGS. 9A to 11B, a description will be given of a setting method in a case where a user who has no administrator right merges an image of a character string with an original image when a process which involves printing such as copying is to be performed.

FIGS. 9A to 11B show exemplary character string setting screens displayed on the liquid crystal display unit 401, and they are displayed for a user who has no administrator right and for whom a display language is English. It should be noted that although in the following description of the present embodiment, a display language is English, a display language is not limited to English.

Figure 9A:
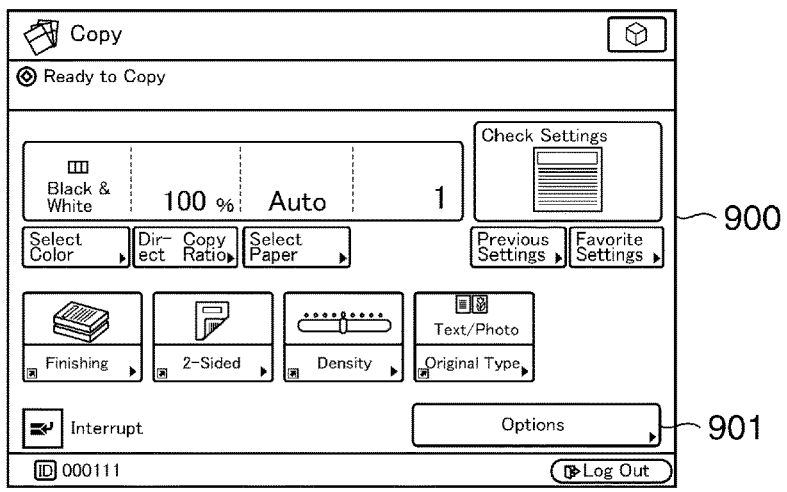
FIGS. 9A to 9C are views which are useful in explaining a setting method in a case where a user merges an image of a character string with an original image and shows a case where a display language is English.
Figure 9B:
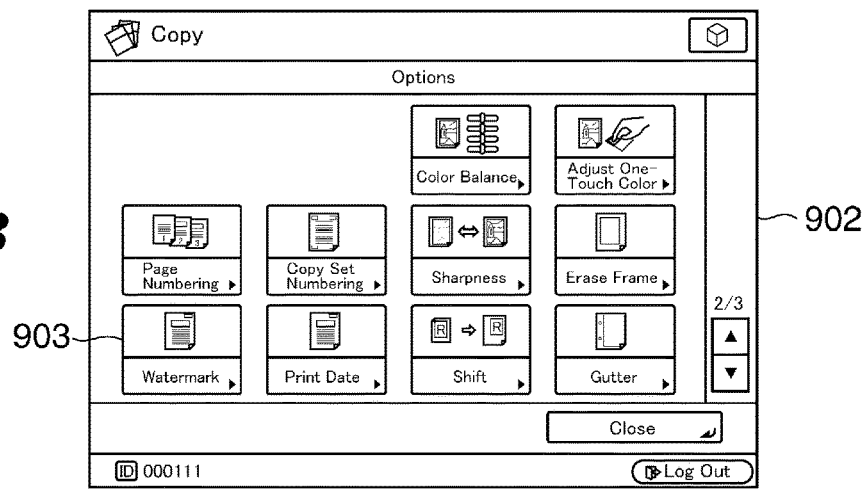

When the user depresses an Options button 901 on a copy screen 900 shown in FIG. 9A so as to merge a character string with an original image, a print setting screen 902 shown in FIG. 9B is displayed.

Figure 9C:
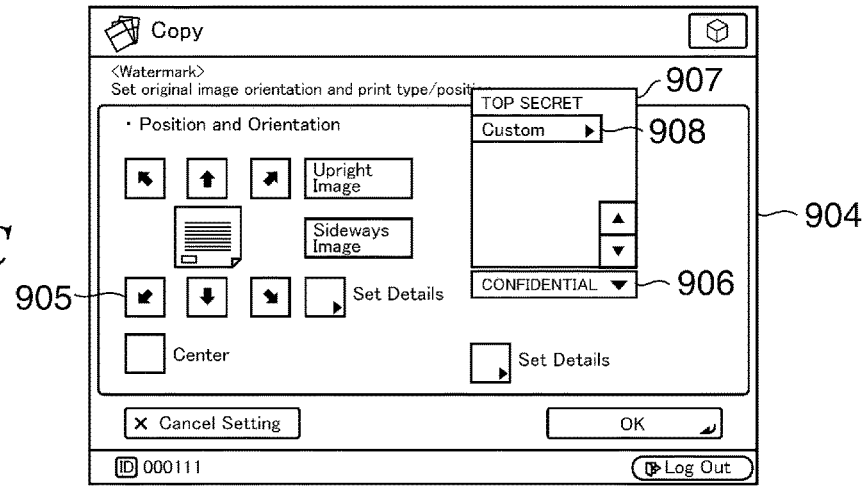

Next, when the user depresses a Watermark setting button 903 on the print setting screen 902, a merging setting screen 904 in FIG. 9C for configuring settings as to merging of a character string image is displayed. On the merging setting screen 904, a setting that merges a character string image with a lower left part of an original image is configured at default. Specifically, a lower left position specifying button 905 has been depressed on the default merging setting screen 904.

Figure 10A:
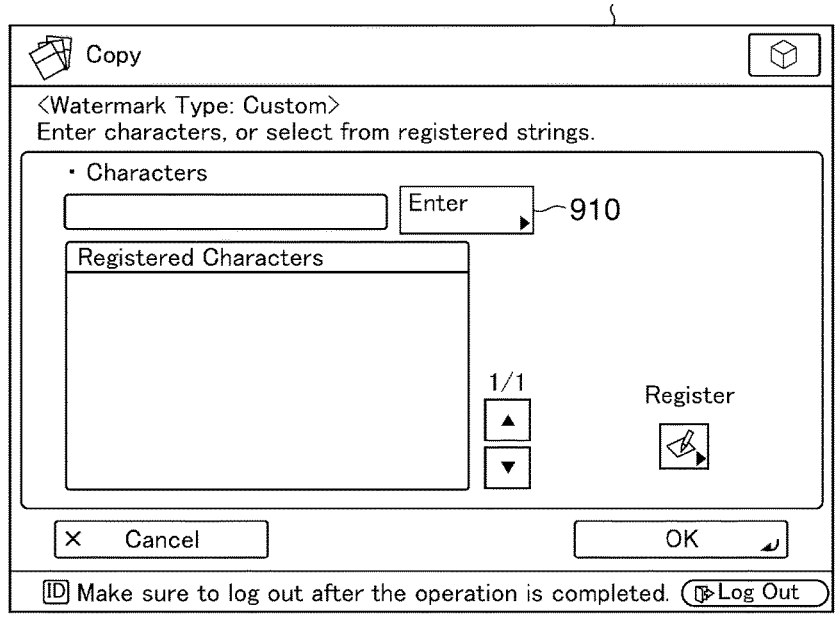
FIGS. 10A and 10B are views which are useful in explaining a setting method in a case where a user merges an image of a character string with an original image and shows a case where a display language is English.
Figure 10B:
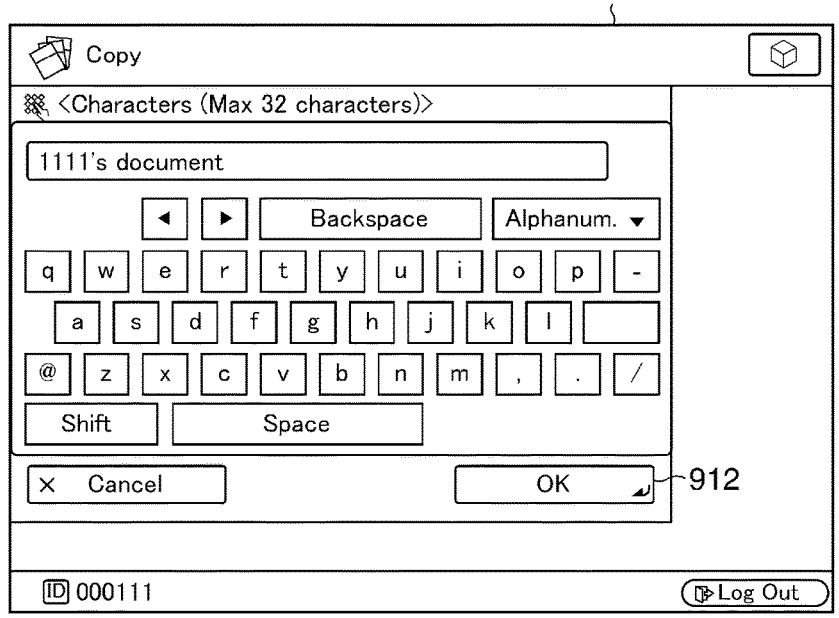

When the user depresses a drop down list button 906 on the merging setting button 904, a drop down list 907 is displayed. Subsequently, when the user depresses a Custom button 908 on the drop down list 907, a character string input screen 909 in FIG. 10A for setting an arbitrary character string is displayed. When the user depresses an Enter button 910 on the character string input screen 909, a keyboard screen 911 shown in FIG. 10B is displayed.

Figure 11A:
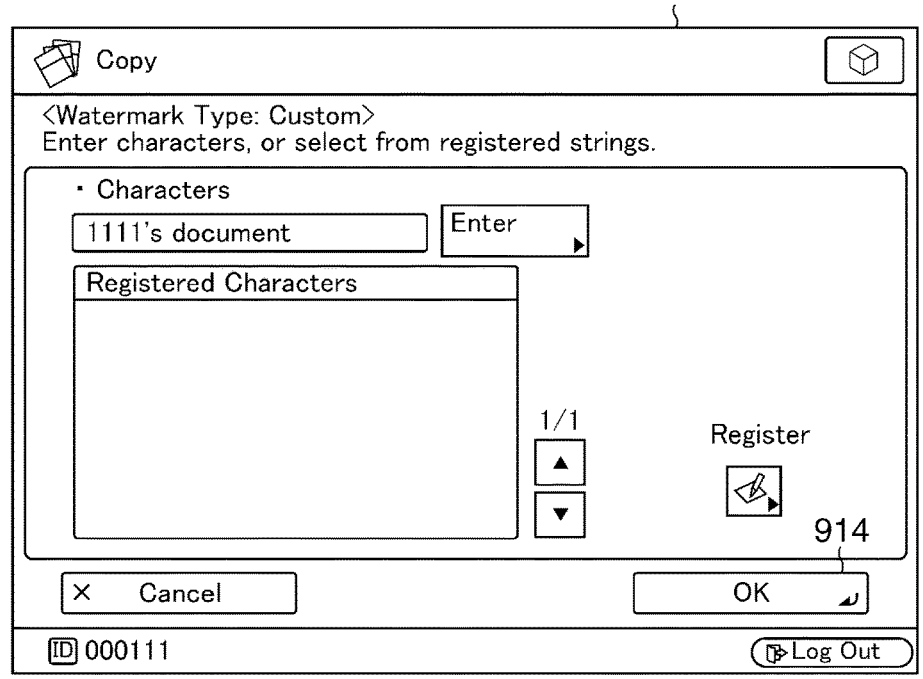
FIGS. 11A and 11B are views which are useful in explaining a setting method in a case where a user merges an image of a character string with an original image and shows a case where a display language is English.
Figure 11B:
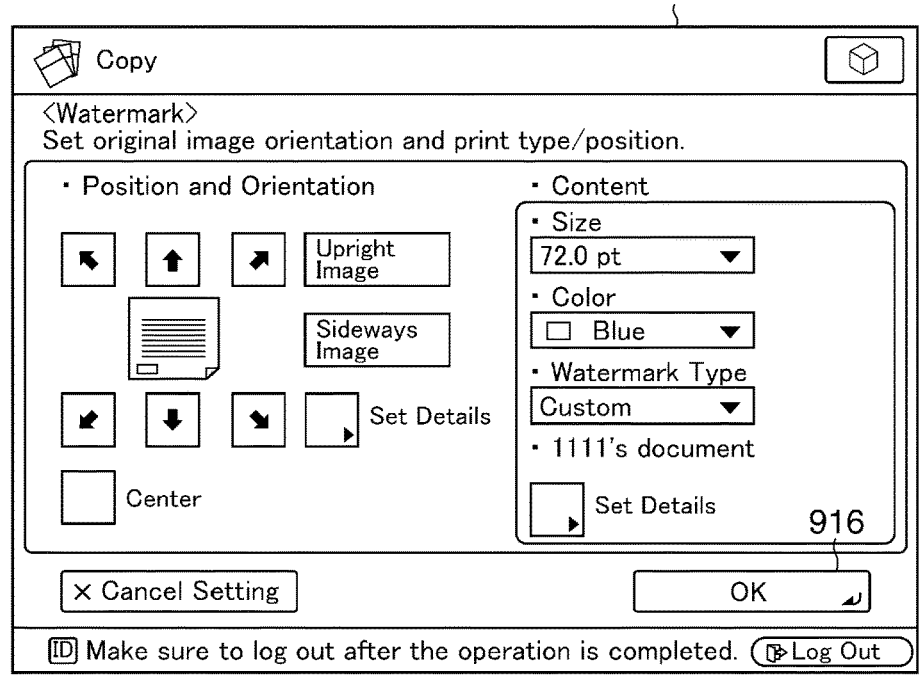

The user inputs a character string using a software keyboard on the keyboard screen 911 and depresses an OK button 912. As a result, a character string deciding screen 913 shown in FIG. 11A is displayed. It should be noted that in the case shown in FIG. 10B, a character string "1111's document" is input. When the user depresses an OK button 914 on the character string deciding screen 913, a confirmation screen 915 shown in FIG. 11B is displayed.

On the confirmation screen 915, the character string "1111's document" entered on the keyboard screen 911 is displayed. When the user depresses an OK button 916 on the confirmation screen 915, the character string is registered and stored with display language information on the user as composite character string information in the memory 202.

Although the DISK 211 is used for registration of a character string by an administrator in FIG. 7A to 8B, the memory 202 is used for registration of a character string by a user. Even in registration of a character string by a user, however, the DISK 211 is preferably used when, for example, a character string is reused. It should be noted that display language information on a user shows a language displayed on the liquid crystal display unit 401 for the user by the image processing apparatus 100 and set in advance during user registration for the image processing apparatus 100.

Figure 12B:
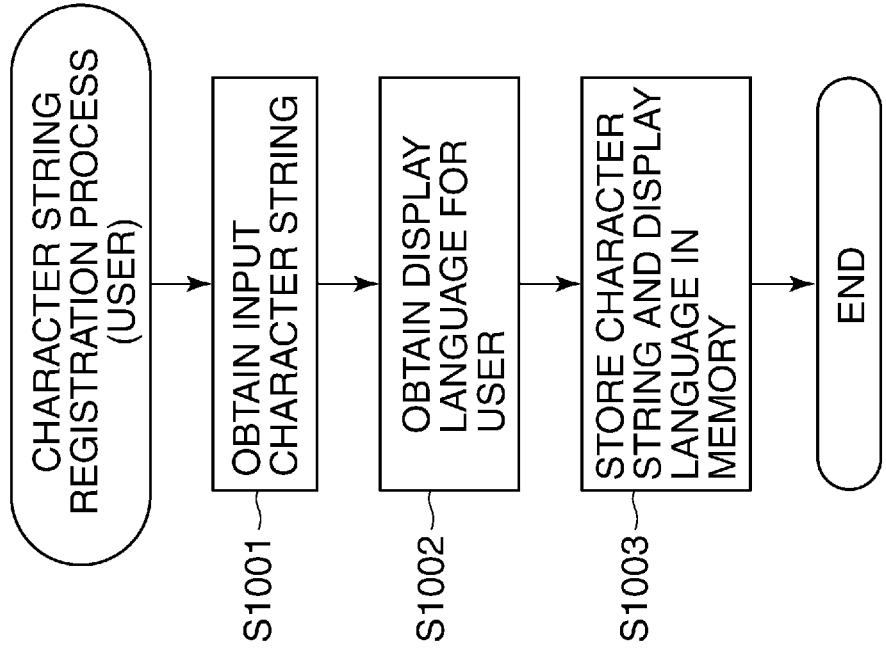
FIGS. 12A and 12B are flowcharts showing the procedure of a character string registration process which is carried out by the CPU.
Figure 12A:
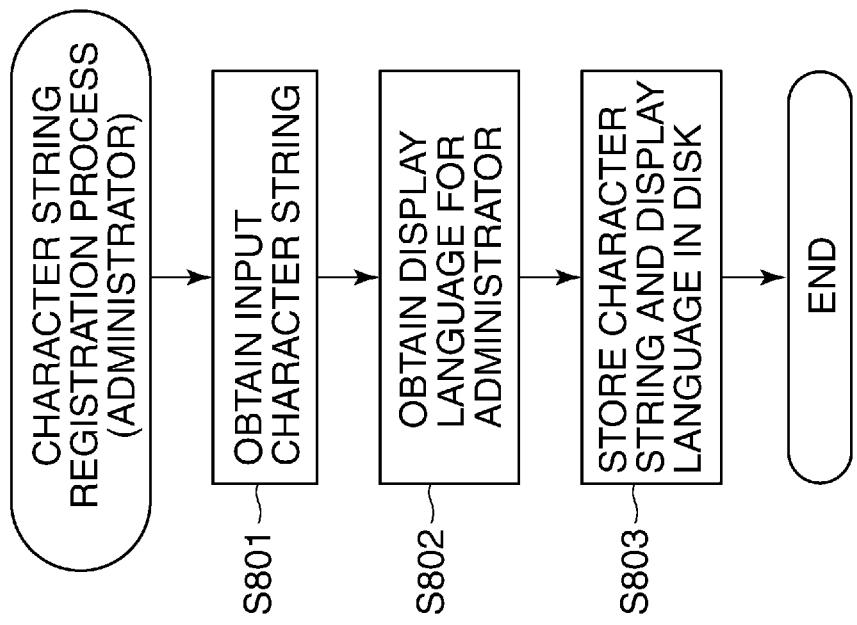

FIGS. 12A and 12B are flowcharts showing the procedure of a character string registration process which is carried out by the CPU 201.

FIG. 12A shows a case where an administrator registers a character string, and the process is started with depression of the OK button 712 in FIG. 8B.

Referring to FIG. 12A, the CPU 201 obtains a character string input by the administrator (step S801), obtains display language information on the administrator (step S802), stores merging character string information including the obtained character string and display language information in the DISK 211 (step S803), and terminates the process. As a result, the character string is registered. A detailed description of the composite character string information will be given later.

FIG. 12B shows a case where a user registers a character string, and the process is started with depression of the OK button 913 in FIG. 11B.

Referring to FIG. 12B, the CPU 201 obtains a character string input by the user (step S1001), obtains display language information on the user (step S1002), stores merging character string information including the obtained character string and display language information in the memory 202 (step S1003), and terminates the process. As a result, the character string is registered. After the character string is registered, when the user depresses the start key 402 of the operation unit 106, a copying process is carried out.

Figure 13:
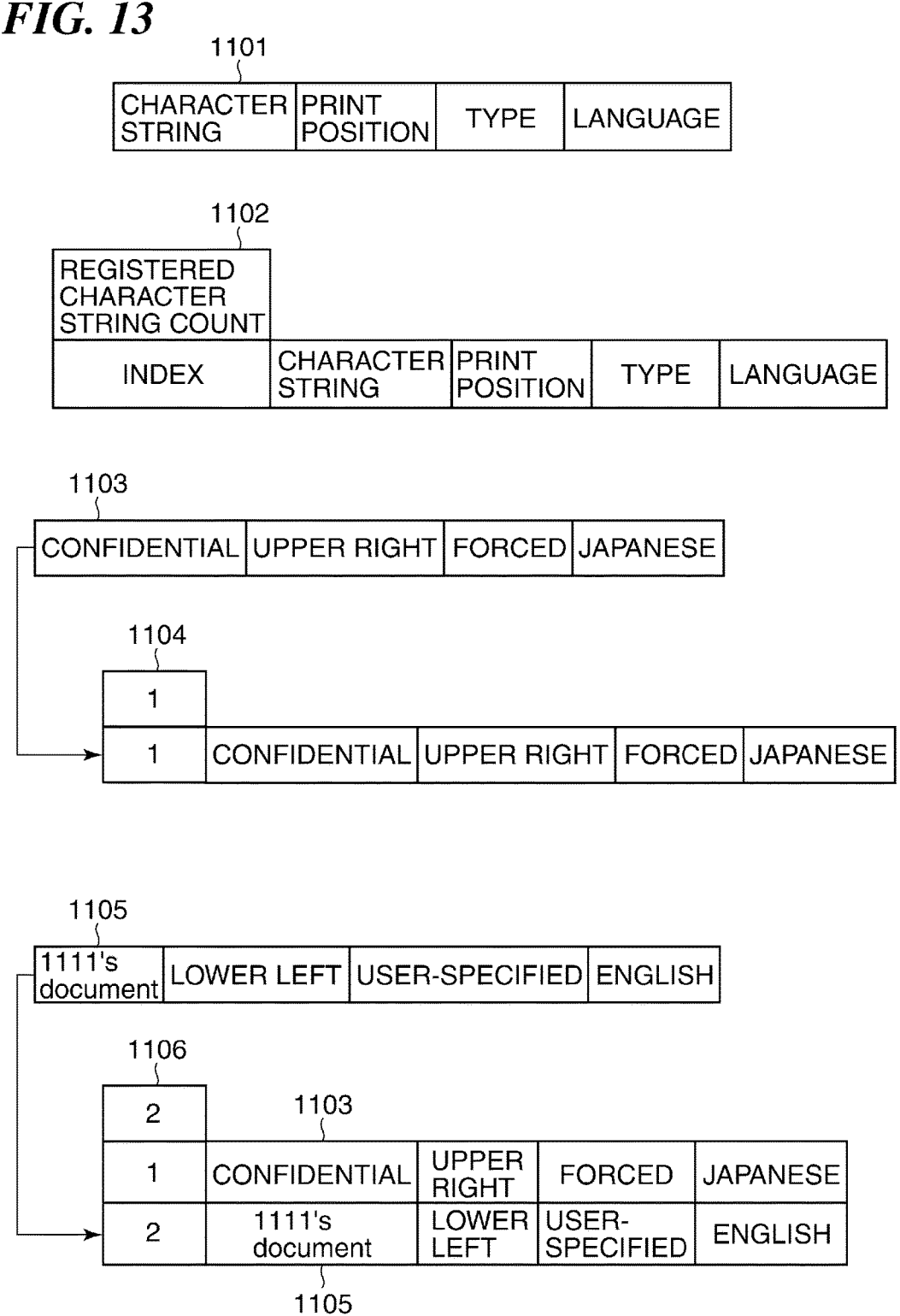
FIG. 13 is a view showing merging character string information and a merging character string table.

FIG. 13 is a view showing merging character string information described above and a merging character string table created based on the merging character string information.

Referring to FIG. 13, the merging character string information 1101 is comprised of a character string field, a print position field, a type field, and a language field.

The character string field shows a character string to be merged with an original image, the print position field shows a print position of a character string shown in FIG. 9B, the type field shows a type, that is, whether or not a character string is one registered by an administrator, and the language field shows a display language for an administrator or a user who has registered a character string. It should be noted that types are expressed with two types consisting of "Forced" and "User-Specified". In the case of a character string registered by an administrator (a second character string), a type thereof is "Forced", and in the case of a character string registered by a user (a first character string), a type thereof is "User-Specified".

When a process involving printing such as a copying process is to be carried out, the merging character string table 1102 is created based on merging character string information on a character string to be merged with an original image. The merging character string table 1102 is provided with a registration character string count field that shows the number of pieces of merging character string information included in the merging character string table 1102, and an index field that identifies each piece of merging character string information.

When a process involving printing is to be carried out, a merging character string table 1104 including merging character string information 1103 on an administrator is created. Then, a merging character string table 1106 is created by adding merging character string information 1105 on a user to the merging character string table 1104. As a result, the merging character string information 1103 on the administrator and the merging character string information 1105 on the user are registered in the merging character string table 1106.

Figure 14:
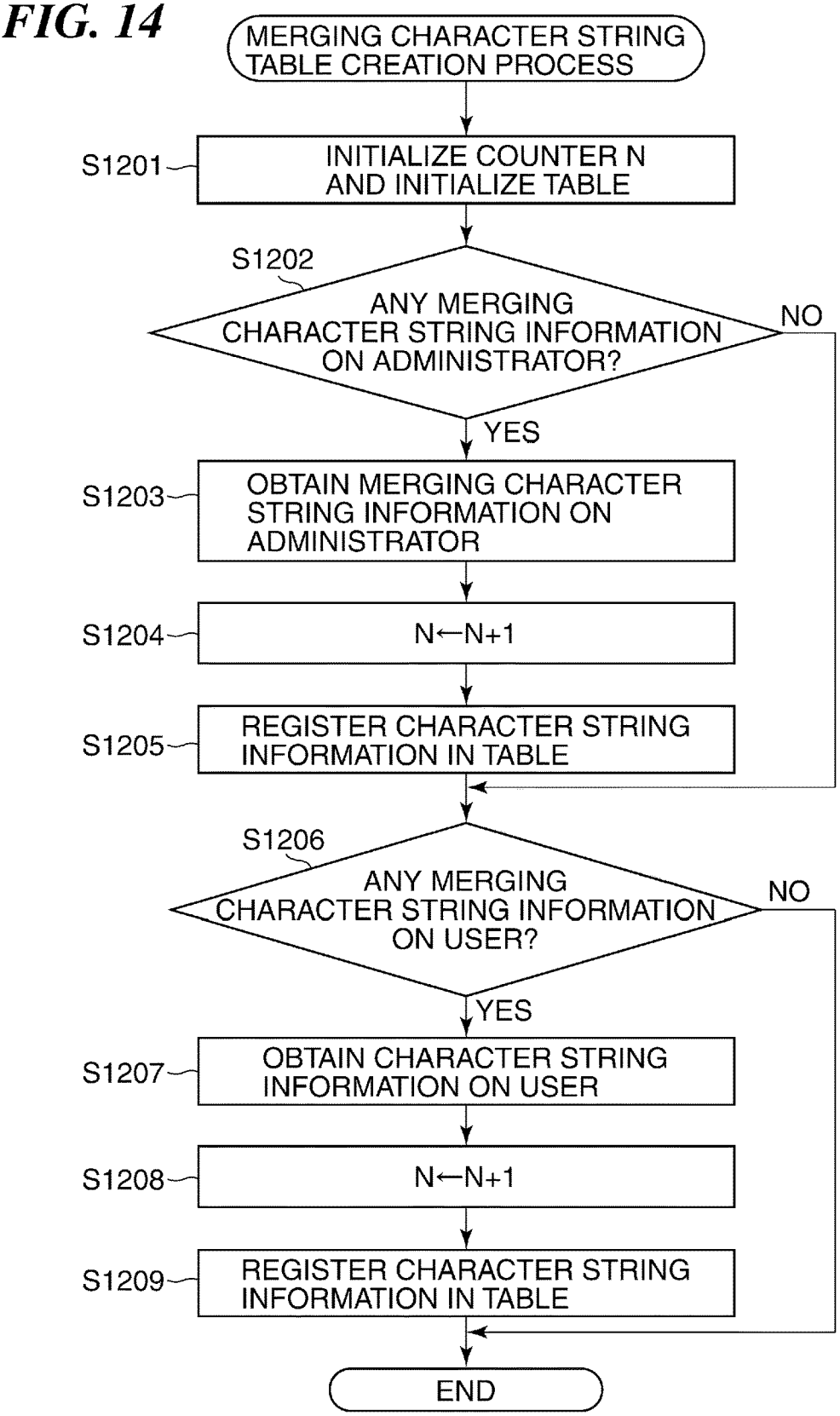
FIG. 14 is a flowchart showing the procedure of a merging character string table creation process which is carried out by the CPU.

FIG. 14 is a flowchart showing the procedure of a merging character string table creation process which is carried out by the CPU 201.

Referring to FIG. 14, first, the CPU 201 initializes a counter for courting a merging character string information count N registered in a merging character string table to be created (N=0), and initializes the merging character string table as well (step S1201). The CPU 201 then refers to the DISK 211 and determines whether or not there is merging character string information on an administrator (step S1202).

As a result of the determination in the step S1202, when there is no merging character string information on the administrator (NO in the step S1202), the process proceeds to step S1206.

On the other hand, as a result of the determination in the step S1202, when there is the merging character string information on the administrator (YES in the step S1202), the CPU 201 obtains the merging character string information on the administrator from the DISK 211 (step S1203). The CPU 201 then increments the merging character string information count N (N=1) (step S1204) and registers the merging character string information on the administrator in the initialized composite character string table (step S1205). At this time, the value of N (N=1) is substituted in the registered character string count field and the index field corresponding to the registered merging character string information on the administrator in the merging character string table.

The CPU 201 then refers to the memory 202 and determines whether or not there is merging character string information on a user (step S1206).

As a result of the determination in the step S1206, when there is no merging character string information on the user (NO in the step S1206), the CPU 201 terminates the process.

On the other hand, as a result of the determination in the step S1206, when there is the merging character string information on the user (YES in the step S1206), the CPU 201 obtains the merging character string information on the user (step S1207). The CPU 201 then increments the merging character string information count N (N=2) (step S1208) and additionally registers the merging character string information on the user in the merging character string table (step S1209). At this time as well, the value of N (N=2) is substituted in the registered character string count field and the index field corresponding to the registered merging character string information on the user in the merging character string table, followed by terminating the process.

It should be noted that in the process described above, when there is a plurality of pieces of merging character string information on the administrator, the process from the steps S1203 to S1205 is repeated a number of times corresponding to the number of pieces of merging character string information on the administrator.

Likewise, when there is a plurality of pieces of merging character string information on the user, the process from the steps S1207 to S1209 is repeated a number of times corresponding to the number of pieces of merging character string information on the user.

The merging character string table thus created is used for image processing that merges a character string with an original image. The process to merge a character string with an original image is controlled by a character string image creation module 1301 which is software.

Figure 15:
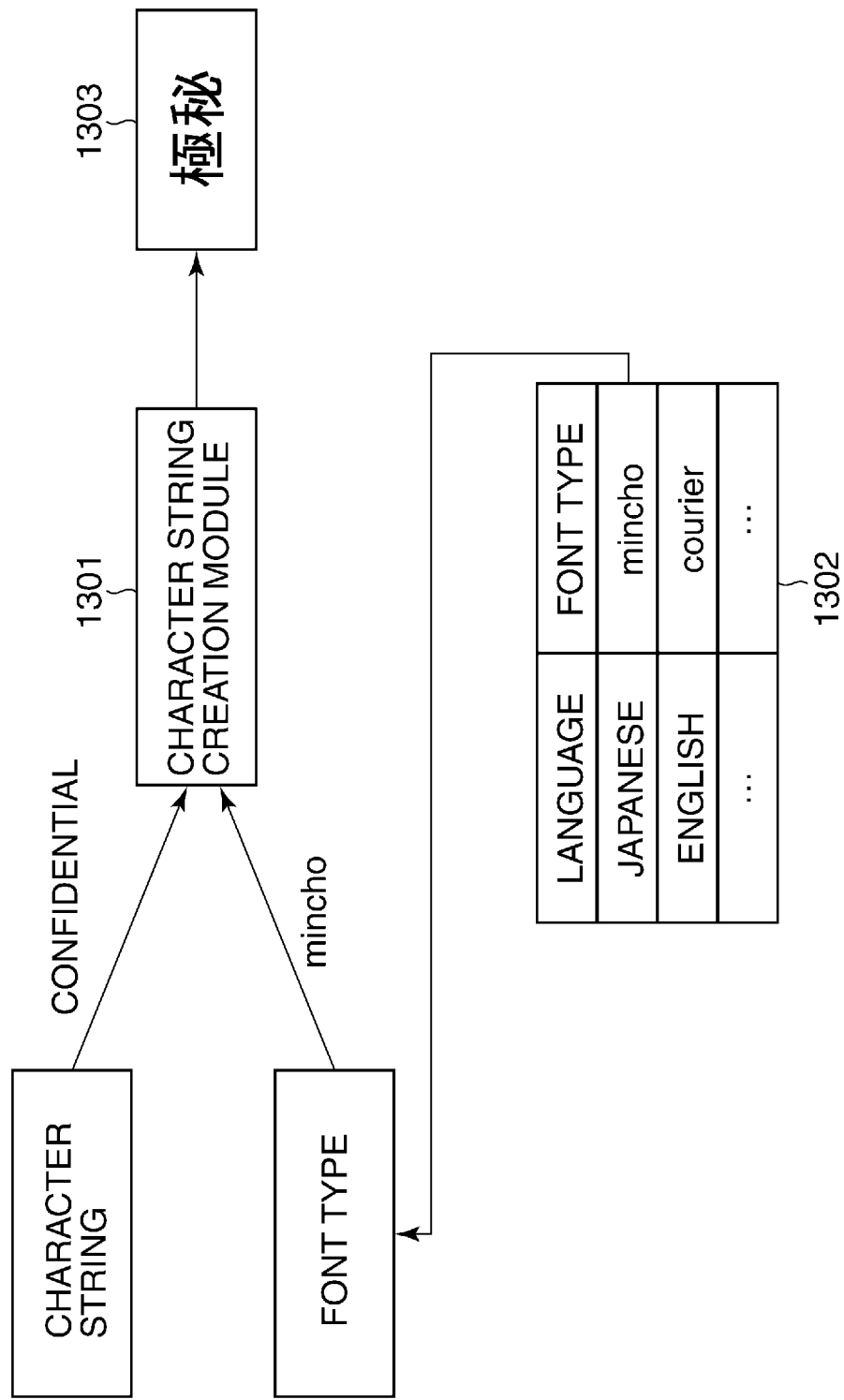
FIG. 15 is a view which is useful in explaining a character string generation step.

FIG. 15 is a diagram which is useful in explaining a character string image generation step which is executed by the character string image creation module 1301.

The character string image creation module 1301 uses a font expansion technique that generates a bitmap image from a character string using a font dependent on a display language and a character string using a font not dependent on a display language such as Unicode. There are various font expansion techniques for generating a character string as a bitmap image such one which uses a bitmap font and one which uses a vector font, and according to the present invention, any technique may be used.

Referring to FIG. 15, when the character string image creation module 1301 recognizes that a character string "Confidential" to be merged with an original image is registered, and a font type for the registered character string is "mincho", it outputs a bitmap image 1303 which represents the character string "Confidential".

It should be noted that the character string image creation module 1301 recognizes a font type by referring to a font table 1302 shown in FIG. 15 and using a language indicated by the language field in the merging character string table 1102 described above with reference to FIG. 13 as a key.

Some fonts cannot express Japanese like "courier". The present embodiment may be applied even to such fonts which support limited languages.

Figure 16:
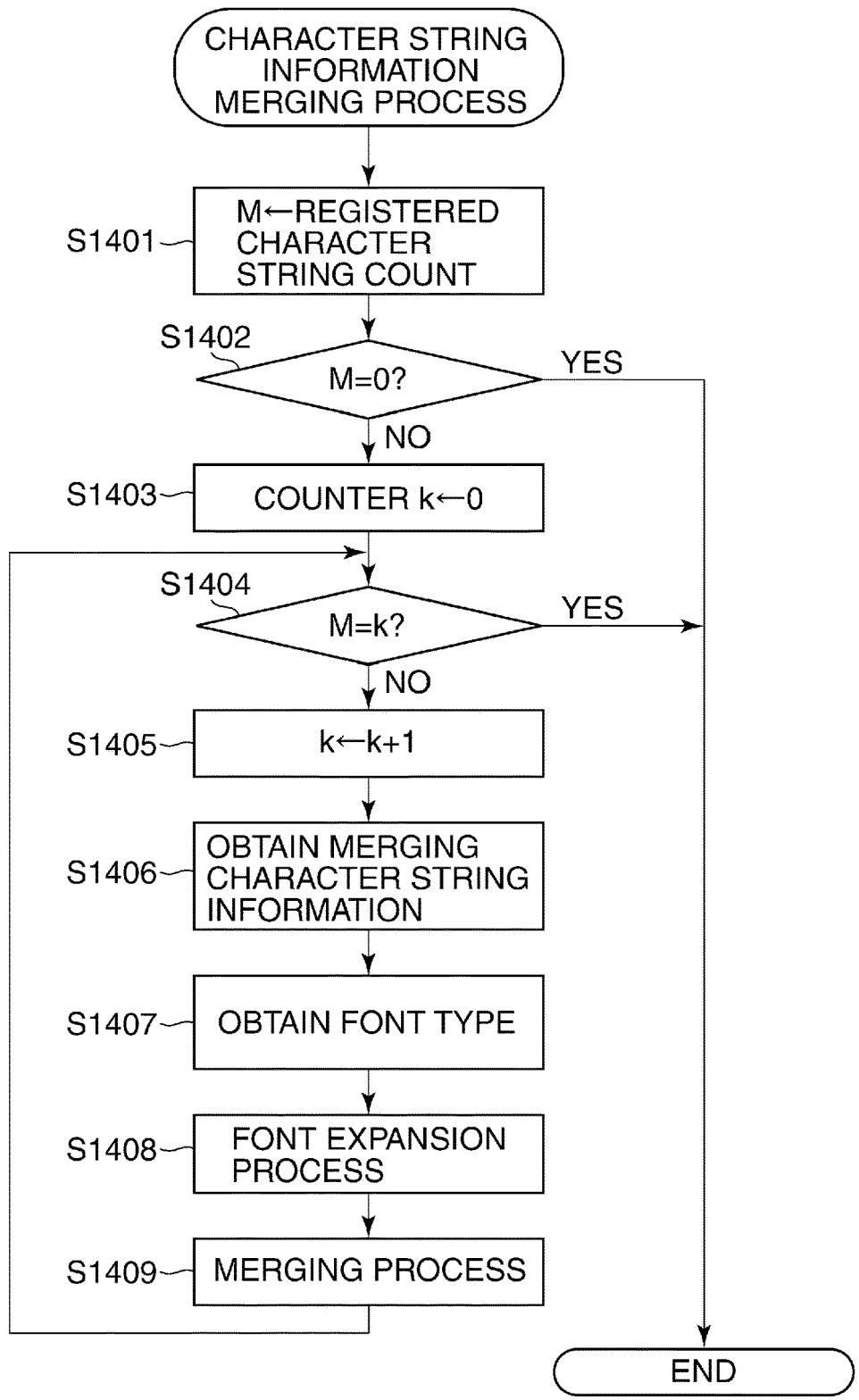
FIG. 16 is a flowchart showing an exemplary character string merging process which is carried out by the CPU in FIG. 4.

FIG. 16 is a flowchart showing the procedure of a character string merging process which is carried out by the CPU 201. In the description referring to FIG. 16, the character string merging process is carried out in a case where the number of pieces of merging character string information on an administrator is one and the number of pieces of merging character string information on a user is one in the merging character string table described above with reference to FIG. 13, but the present invention is not limited to this.

First, the CPU 201 obtains a registered character string count from the registered character string count field in the merging character string table and assumes it as a variable M (step S1401). The CPU 201 then determines whether or not M=0 holds (step S1402). As a result of the determination in the step S1402, when M=0 holds (YES in the step S1402), the CPU 201 terminates the process because there is no character string to be merged with an original image.

On the other hand, as a result of the determination in the step S1402, when M=0 does not hold (NO in the step S1402), the CPU 201 initializes a counter for courting a character string count k which is the number of character strings whose fonts have already been expanded (character strings have already been merged with an original image) among character strings registered in the merging character string table (k=0) (step S1403).

The CPU 201 then determines whether or not M=k holds (step S1404). As a result of the determination in the step S1404, when M=k does not hold (NO in the step S1404), the CPU 201 increments k (k=1) (step S1405) and obtains merging character string information whose value in the index field of the merging character string table is equal to k (step S1406). Further, the CPU 201 obtains a character string and a language in the character string filed and the language filed in the merging character string table and obtains a font type by referring to the font table 1302 in FIG. 15 using the obtained language as a key (step S1407).

The CPU 201 then causes the character string image generation module 1301 to carry out a font expansion process. As a result, the character string image generation module 1301 creates a character string image that represents a character string in a font of the obtained type (step S1408). The CPU 201 then carries out a merging process on an original image using a bitmap image which is the character string image output from the character string image generation module 1301 (step S1409), followed by the process returning to the step S1404.

On the other hand, as a result of the determination in the step S1404, when M=k holds (YES in the step S1402), the CPU 201 determines that all character strings have been merged with the original image and terminates the process.

Figure 17:
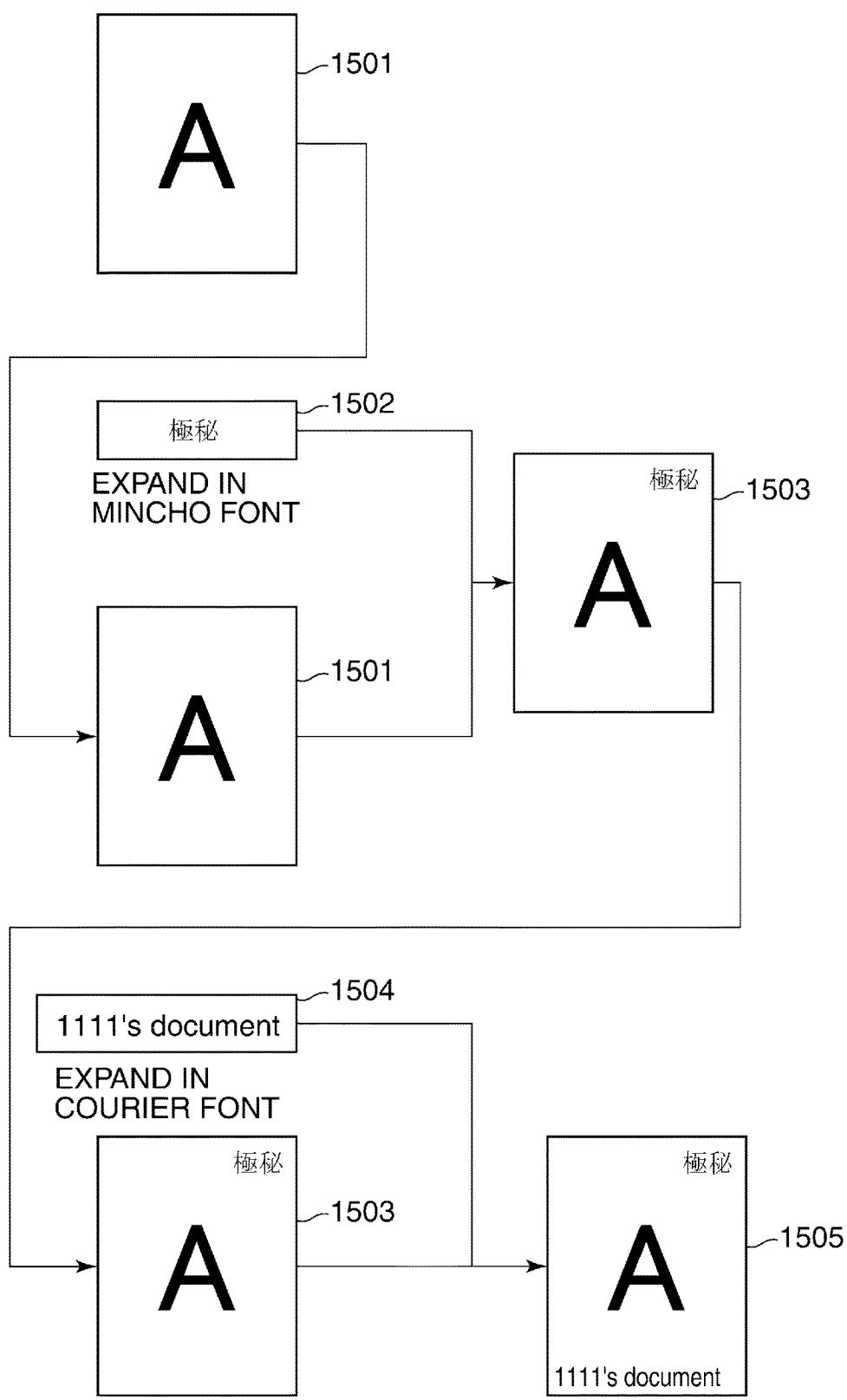
FIG. 17 is a view showing an exemplary character string merging process in a case where the merging character string table in FIG. 13 is used.

FIG. 17 is a diagram showing an exemplary character string merging process in a case where the merging character string table 1106 in FIG. 13 is used.

Referring to FIG. 17, an original image 1501 which is a bitmap image of a scanned original is stored in the memory 202. To output printed matter without merging any character string with the original image 1501, only the original image 1501 is printed.

When the character string merging process in FIG. 16 is carried out in this state, first, the number of registered character strings in the registered character string count field in the merging character string table 1106 is substituted to the variable M, so that M=2 (step S1401), and the number of character strings k whose fonts has already been expanded is incremented (step S1405), so that k=1.

Thus, first, processing is performed on merging character string information whose value in the index field of the merging character string table 1106 is 1. A character string "Confidential", a print position "Upper right", a type "Forced", and a language "Japanese" are obtained from the merging character string information whose value in the index field is 1 (step S1406). Then, the font table 1302 in FIG. 15 is referred to using the obtained language as a key, and a font type "mincho" is obtained (step S1207).

After that, a font expansion process for the character string "Confidential" is carried out (step S1408), and a character string image 1502 which represents the character string "Confidential" in "mincho" is output from the character string image generation module 1301. The original image 1501 and the character string image 1502 are then merged with each other (step S1409) to generate a composite image 1503.

Then, because M=2 and k=1 hold (NO in the step S1404), k is incremented again (step S1405), so that k=2.

Therefore, from then on, processing is performed on merging character string information whose value in the index field of the merging character string table 1106 is 2. A character string "1111's document", a print position "Lower left", a type "User-specified", and a language "English" are obtained from the merging character string information whose value in the index field is 2 (step S1406). Then, the font table 1302 is referred to using the obtained language as a key, and a font type "courier" is obtained (step S1407).

After that, a font expansion process for the character string "1111's document" is carried out (step S1408), and a character string image 1504 which represents the character string "1111's document" in "courier" is output from the character string image generation module 1301. The composite image 1503 and a character string image 1504 are then merged with each other (step S1409) to generate a composite image 1505.

Here, because M=2 and k=2 hold (YES in the step S1404), the character string merging process is terminated. As a result, the composite image 1505 is printed as a final image on a recording medium by the printer unit 302.

In the character string merging process described above, in an environment where an administrator and a user use different languages, character string images are created by referring to a font table in which a plurality of fonts corresponding to respective ones of a plurality of languages is set. As a result, merging character strings designated by the administrator and the user can be superimposed on an original image and printed without garbling.

Figure 18:
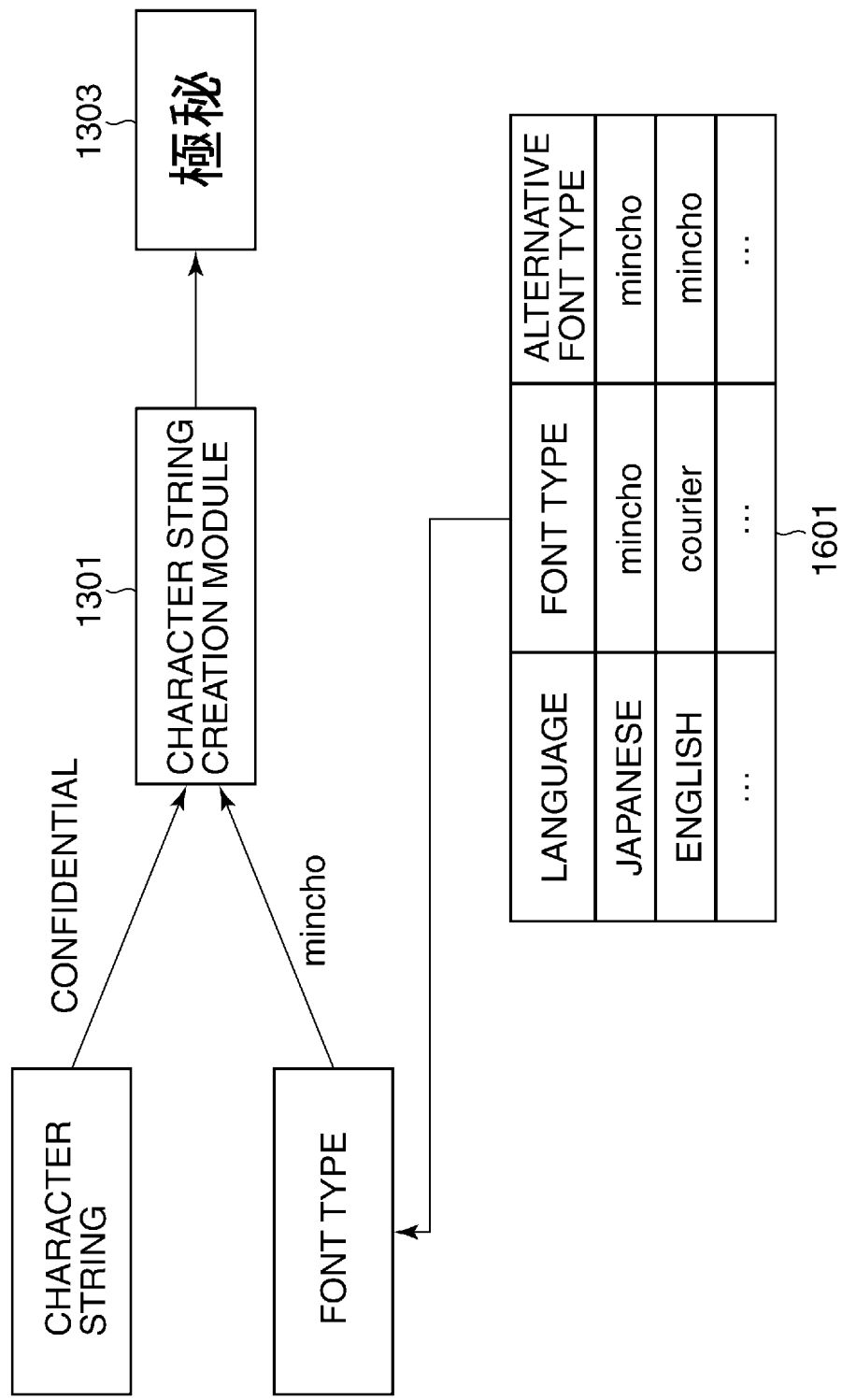
FIG. 18 is a diagram showing a character string image generation step in a case where a font table provided with an alternative font type is used.
Figure 19:
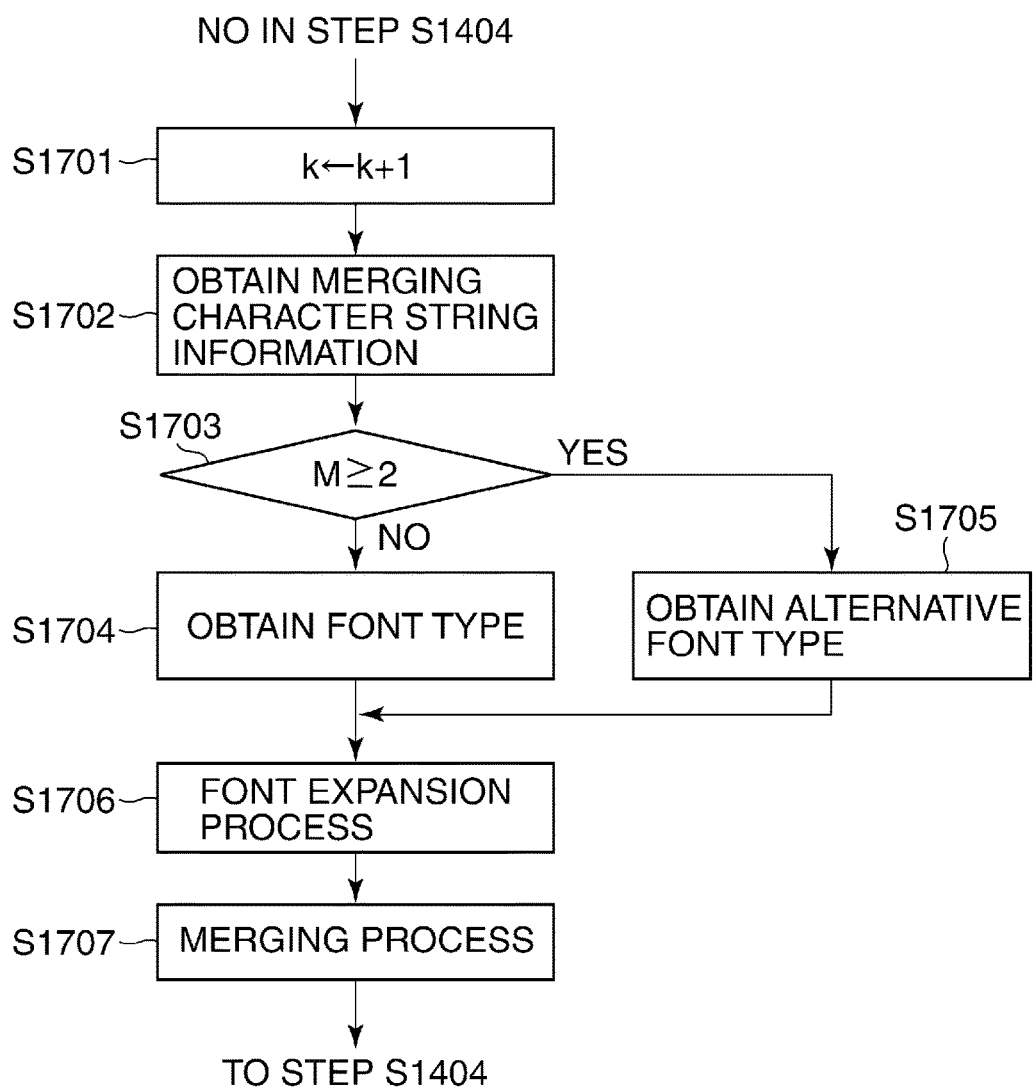
FIG. 19 is a flowchart showing the procedure of a character string merging process which is carried out by the CPU in a case where an alternative font is used.
Figure 20:
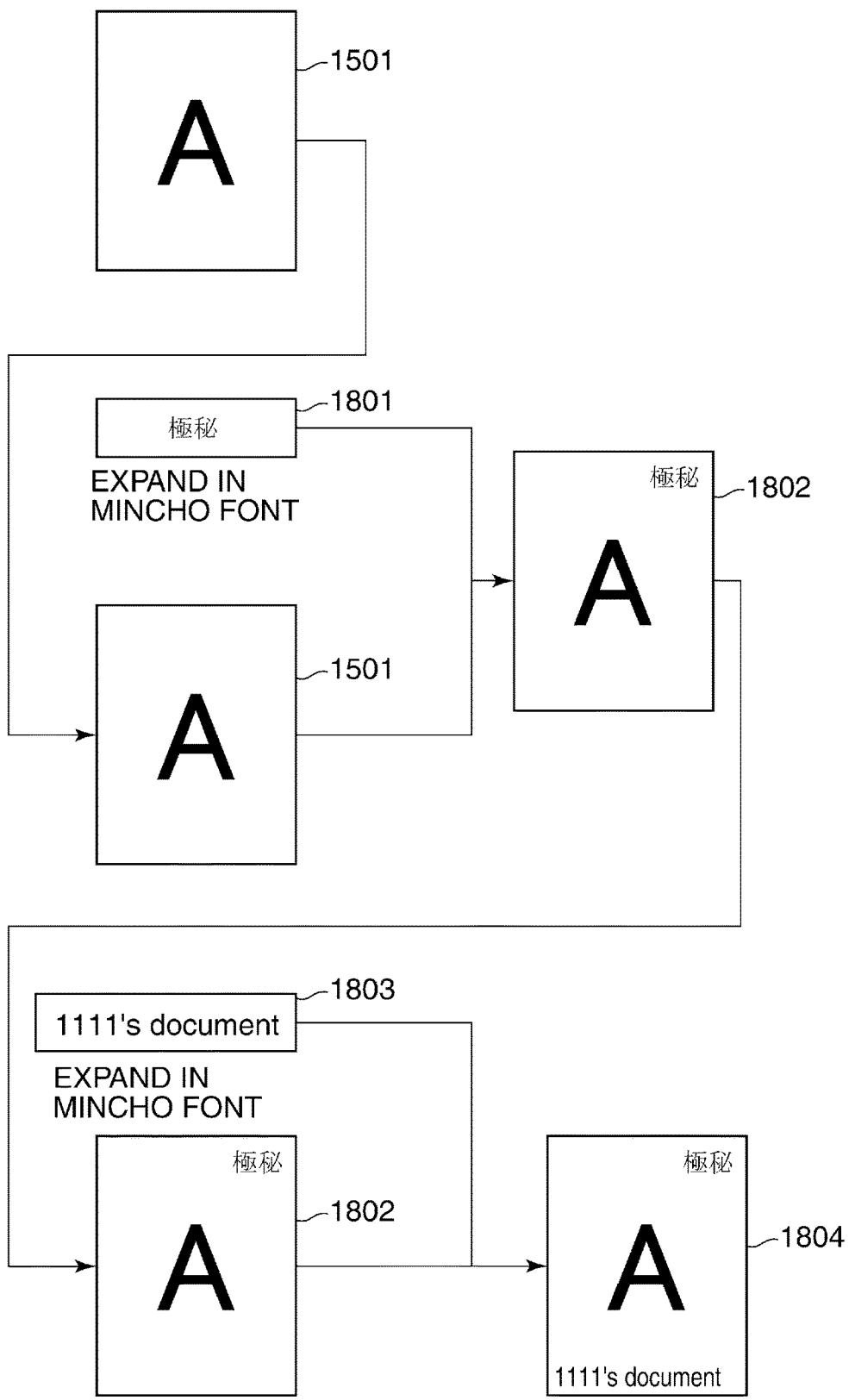
FIG. 20 is a view showing an exemplary character string merging process in a case where the font table in FIG. 18 is used.

Referring now to FIGS. 18 to 20, a description will now be given of a character string merging process in a case where a font table additionally provided with an "alternative font type" is used as a font table when a character string is merged with an original image using a font of one type in an environment where an administrator and a user use different languages.

FIG. 18 is a diagram showing a font table 1601 provided with an "alternative font type".

In the font table 1601, the "alternative font type" means an alternative font used as an alternative to "font types". It should be noted that the alternative font can express all languages used in the image processing apparatus 100. For example, "mincho" in the figure is a font that is able to express not only Japanese but also English.

A character string merging process in a case where an alternative font is used can be realized by modifying a part of the flowchart in FIG. 16.

FIG. 19 is a flowchart showing the procedure of a character string merging process which is carried out by the CPU 210 in a case where an alternative font is used.

FIG. 19 shows only a process from step S1701 to S1707 because this is a modification of the process from the step S1405 to the step S1409 in the character string merging process in FIG. 16.

Namely, the process from obtainment of the determination result NO in the step S1404 in FIG. 16 to returning again to the step S1404 is shown in FIG. 19, and hence duplicate description of the process in FIG. 16 is omitted.

As a result of the determination in the step S1404, when the variable M corresponding to the number of registered character strings in the merging character string table is not equal to the font-expanded character string count k (NO in the step S1404), the CPU 201 increments k (step S1701) and obtains merging character string information whose value in the index field of the merging character string table is equal to k (step S1702).

The CPU 201 then determines whether or not M≥2 holds (step S1703). As a result of the determination in the step S1703, when M≥2 holds (YES in the step S1703), a plurality of fonts may be used because there is a plurality of registered character strings in the merging character string table. Therefore, to unify fonts for use into one type, the CPU 201 obtains an alternative font type in the font table 1601 (step S1705), followed by the process proceeding to step S1706.

On the other hand, as a result of the determination in the step S1703, when M≥2 does not hold (NO in the step S1703), it is unnecessary to use an alternative font because the number of registered character strings in the merging character string table is one, and only a font of one type is used. Therefore, as in the case of the character string merging process in FIG. 16, the CPU 201 obtains a font type from the font table 1601 (step S1704), followed by the process proceeding to the step S1706.

The CPU 201 then causes the character string image generation module 1301 to carry out a font expansion process. As a result, the character string image generation module 1301 creates a character string image that represents a character string in a font of the obtained type (step S1706). The CPU 201 then carries out a merging process on an original image using a bitmap image which is the character string image output from the character string image generation module 1301 (step S1707), followed by the process returning to the step S1404.

Thus, in the character string merging process in FIG. 19, when a plurality of character strings is registered as character strings to be merged with an original image which is an object to be printed, a font that can express all languages used in the image processing apparatus 100 is used as an alternative font in place of fonts corresponding to the respective character strings.

FIG. 20 is a diagram showing an exemplary character string merging process in a case where the merging character string table 1106 in FIG. 13 and the font table 1601 in FIG. 18 are used.

Referring to FIG. 20, an original image 1501 which is a bitmap image of a scanned original is stored in the memory 202. To output printed matter without merging any character string with the original image 1501, only the original image 1501 is printed.

When the character string merging process in FIG. 19 is carried out in this state, first, the number of registered character strings in the registered character string count field in the merging character string table 1106 is substituted to the variable M, so that M=2 (step S1401), and the number of character strings k whose fonts has already been expanded is incremented (step S1701) so that k=1.

Therefore, first, processing is performed on merging character string information whose value in the index field of the merging character string table 1106 is 1. A character string "Confidential", a print position "Upper right", a type "Forced", and a language "Japanese" are obtained from the merging character string information whose value in the index field is 1 (step S1702).

Then, because M=2 holds (YES in the step S1703), a font type "mincho" is obtained by referring to the font table 1601 (step S1705).

After that, a font expansion process for the character string "Confidential" is carried out using "mincho" (step S1706), and a character string image 1801 which represents the character string "Confidential" in "mincho" is output from the character string image generation module 1301. The original image 1501 and the character string image 1801 are then merged with each other (step S1707) to generate a composite image 1802.

Here, because M=2 and k=1 hold (NO in the step S1404), k is incremented again (step S1701), so that k=2.

Therefore, from then on, processing is performed on merging character string information whose value in the index field of the merging character string table 1106 is 2. A character string "1111's document", a print position "Lower left", a type "User-specified", and a language "English" are obtained from the merging character string information whose value in the index field is 2 (step S1702).

Then, because M=2 holds (YES in the step S1703), a font type "mincho" is obtained by referring to the font table 1601 (step S1705).

After that, a font expansion process for the character string "1111's document" is carried out using "mincho" (step S1706), and a character string image 1803 which represents the character string "1111's document" in "mincho" is output from the character string image generation module 1301. The composite image 1802 and the character string image 1803 are then merged with each other (step S1707) to generate a composite image 1804.

Here, because M=2 and k=2 hold (YES in the step S1404), the character string merging process is terminated. As a result, the composite image 1804 is printed as a final image on a recording medium by the printer unit 302.

As described above, even in a case where a plurality of character string images registered in a plurality of display languages is to be merged with an original image, the character strings can be merged with the original image using an alternative font without causing garbling or the like.

It should be noted that even when the number of character strings to be merged is one, an alternative font may be used whenever display languages are configured to be changeable.

It should be noted that although the image processing apparatus 100 according to the present embodiment has the printer unit 302 and the scanner unit 102 as described above, the printer unit 302 and the scanner unit 102 may be dispensed with, and a character string may be merged with an original image obtained from another apparatus or an original image stored in advance in the image processing asparagus 100 to create a composite image, which in turn is printed by another apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193187 field Sep. 18, 2013, which is hereby incorporated by reference herein in its entirety.

What is claimed is:

1. An image forming apparatus comprising:
   a storage;
   one or more processors connected to a memory, the one or more processors being configured to:
   store in the storage a first character string set by an administrator using first language information and to be printed forcefully on printed matter, in association with the first language information;
   store in the storage a second character string set by a login user using second language information and to be printed on printed matter, in association with the second language information;
   generate a first character image data which represents the first character string stored in the storage with a first font corresponding to the first language information and generate a second character image data which represents the second character string stored in the storage with a second font corresponding to the second language information; and
   merge the first character image data and the second character image data with an image data for printing.

2. The image forming apparatus according to claim 1, wherein the first language information and the second language information are display languages for an operation screen displayed at a time of setting a character string.

3. The image forming apparatus according to claim 1, the one or more processors being configured to store information indicative of the first character string and the second character string as a language-independent character code, respectively.

4. The image forming apparatus according to claim 3, wherein the language-independent character code is Unicode.

5. The image forming apparatus according to claim 1, the one or more processors being further configured to merge the first character image data and the second character image data with an image data to create a composite image data, and perform printing of the composite image data.

6. The image forming apparatus according to claim 5, the one or more processors being configured to store positional information indicative of a position at which a character string is to be printed, and
   based on the positional information stored in the storage, the one or more processors being configured to perform printing of the first character image data and the second character image data on different positions on one sheet.

7. The image forming apparatus according to claim 1, the one or more processors being configured to generate the first character image data which represents the first character string with an alternative font by using the alternative font as an alternative to a font corresponding to the first character information.

8. A control method for an image forming apparatus, comprising:
   a first setting step of setting a first character string by an administrator using first language information;
   a first storage step of storing the first character string set by the first setting step and to be printed forcefully on printed matter in association with the first language information;
   a second setting step of setting a second character string by a login user using second language information;
   a second storage step of storing the second character string set by the second setting step and to be printed on printed matter, in association with the second language information;
   a generation step of generating a first character image data which represents the first character string stored in the first storage step with a first font corresponding to the first language information and generating a second character image data which represents the second character string stored in the second storage step with a second font corresponding to the second language information; and
   a merging step of merging the first character image data and the second character image data with an image data for printing.

9. The control method according to claim 8, comprising storing information indicative of the first character string and the second character string as a language-independent character code, respectively.

10. The control method according to claim 8, comprising merging the first character image data and the second character image data with an image data to create a composite image data, and performing printing of the composite image data.

11. The control method according to claim 10, comprising storing positional information indicative of a position at which a character string is to be printed, and
    based on the stored positional information, performing printing of the first character image data and the second character image data on different positions on one sheet.

12. The control method according to claim 8, comprising generating the first character image data which represents the first character string with an alternative font by using the alternative font as an alternative to a font corresponding to the first character information.

* * * * *